United States Patent
Nagatomo et al.

(10) Patent No.: US 6,717,522 B1
(45) Date of Patent: Apr. 6, 2004

(54) MESSAGE PROVIDING APPARATUS

(75) Inventors: Hideo Nagatomo, Tokyo (JP); Toshihiko Kobayashi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 09/596,061

(22) Filed: Jun. 16, 2000

(30) Foreign Application Priority Data

Aug. 26, 1999 (JP) .......................... 11-239978
Aug. 27, 1999 (JP) .......................... 11-241190

(51) Int. Cl.$^7$ .............................................. G08B 5/00
(52) U.S. Cl. .............................. 340/815.4; 340/825.22; 340/825.27; 704/270; 704/278; 705/17; 705/27; 705/41
(58) Field of Search ..................... 340/815.4, 825.25, 340/825.22, 825.15, 825.34, 825.35, 825.55, 825.4, 825.27; 395/186, 187, 200.33, 681; 704/270, 278; 705/17, 27, 41

(56) References Cited

U.S. PATENT DOCUMENTS

| | | | |
|---|---|---|---|
| 5,053,956 A | | 10/1991 | Donald et al. |
| 5,406,305 A | * | 4/1995 | Shimomura et al. ......... 345/102 |
| 5,499,316 A | * | 3/1996 | Sudoh et al. ............... 395/2.79 |
| 5,511,201 A | * | 4/1996 | Kamimaki et al. .......... 395/750 |
| 5,687,306 A | * | 11/1997 | Blank ......................... 395/135 |
| 5,694,546 A | * | 12/1997 | Reisman ................... 395/200.9 |
| 5,794,202 A | * | 8/1998 | Kim ............................. 704/270 |
| 5,845,261 A | * | 12/1998 | McAbian ..................... 705/26 |
| 5,845,262 A | * | 12/1998 | Nozue et al. ................ 705/26 |
| 5,911,044 A | * | 6/1999 | Lo et al. ................. 395/200.33 |
| 5,974,400 A | * | 10/1999 | Kagami et al. .............. 705/26 |
| 6,026,376 A | * | 2/2000 | Kenney ....................... 705/27 |
| 6,032,130 A | * | 2/2000 | Alloul et al. ................ 705/27 |

FOREIGN PATENT DOCUMENTS

| | | | |
|---|---|---|---|
| DE | 197 26 413 A1 | 1/1999 | ........... G09F/27/00 |
| JP | 1-311364 | 12/1989 | |
| JP | 2-262755 | 10/1990 | |
| JP | 4-149800 | 5/1992 | |
| JP | 5-324674 | 12/1993 | |
| JP | 08030218 | 7/1994 | ........... G09F/27/00 |
| JP | 6-251253 | 9/1994 | |
| JP | 9-163351 | 6/1997 | |
| JP | 10274949 | 7/1997 | ........... G09F/27/00 |
| JP | 11052900 | 7/1997 | ........... G09F/27/00 |
| JP | 2921361 | 4/1999 | |
| JP | 11-161705 | 6/1999 | |
| WO | WO 98/44477 | 10/1998 | ........... G09F/27/00 |

* cited by examiner

Primary Examiner—Daniel J. Wu
Assistant Examiner—Hung Nguyen

(57) ABSTRACT

A message providing apparatus according to one embodiment is apparently a small-sized (for sample, screen size of about 3.5 inches) flat display (for example, LCD), wherein a speaker is provided at a cabinet, and a memory card that is a message data storage medium is inserted into the cabinet. Advertisement display data is stored to be classified into a moving image layer indicating a landscape, a still image layer indicating a commodity, a graphic (POP) layer indicating a price, a character layer indicating a catch phrase, and a sound layer which are displayed to be superimposed as required. BGM music data is also stored as the sound layer, and is reproduced in synchronism with a display. Advertisement characters are printed at the cabinet. When power is supplied, the apparatus automatically starts data reproduction of the memory card (by using a power on play function), and when all the data has been reproduced, the apparatus automatically restarts reproduction (by using an auto replay function). The message providing apparatus can be disposed on a commodity display shelf in place of a conventional advertisement providing apparatus so that image or sound information such as television commercial message popular among consumers can be distributed near commodities.

14 Claims, 19 Drawing Sheets

```
**BEER ADDS PLEASURE TO YOUR LEISURE
```
2D

FIG. 5D ( DETAILS )   ( COUPON )
PLEASE SELECT
2E

| | 001-12345 | 002-12346 | 000-12349 | 000-12350 | 003-12349 | 004-12348 | 000-12451 | 000-12452 | *-**** |
|---|---|---|---|---|---|---|---|---|---|
| 001-12345 | O | x | x | x | x | x | x | x | O |
| 002-12346 | x | O | x | x | x | x | x | x | O |
| 000-12349 | x | x | O | x | x | x | x | x | O |
| 001-****** | O | x | x | x | x | x | x | x | O |
| 002-****** | x | O | x | x | x | x | x | x | O |
| 003-****** | x | x | x | x | O | x | x | x | O |
| 004-****** | x | x | x | x | x | O | x | x | O |
| 000-12350 | x | x | x | O | x | x | x | x | O |
| 001-****** | O | x | x | x | x | x | x | x | O |
| 002-****** | x | O | x | x | x | x | x | x | O |
| 003-****** | x | x | x | O | x | x | x | x | O |
| 004-****** | x | x | x | x | x | O | x | x | O |
| 000-12451 | x | x | x | x | x | x | O | x | O |
| 001-****** | O | x | x | x | x | x | x | x | O |
| 002-****** | x | O | x | x | x | x | x | x | O |
| 003-****** | x | x | x | x | O | x | x | x | O |
| 004-****** | x | x | x | x | x | O | x | x | O |
| 000-12452 | x | x | x | x | x | x | x | O | O |
| 001-****** | O | x | x | x | x | x | x | x | O |
| 002-****** | x | O | x | x | x | x | x | x | O |
| 003-****** | x | x | x | x | O | x | x | x | O |
| 004-****** | x | x | x | x | x | O | x | x | O |
| *-**** | O | O | O | O | O | O | O | O | O |

MESSAGE PROVIDING APPARATUS

CROSS-REFERENCE TO RELATED APPLICATIONS

This application is based upon and claims the benefit of priority from the prior Japanese Patent Applications No. 11-239978, filed Aug. 26, 1999; and No. 11-241190, filed Aug. 27, 1999, the entire contents of which are incorporated herein by reference.

BACKGROUND OF THE INVENTION

The present invention relates to a message providing apparatus for providing a message formed of a still image, moving image, character, graphic and/or sound, such as a message providing apparatus, a commodity display tool, an advertisement display panel, and an advertisement display tool, for advertising a commodity and service for sales promotion within or outside of a retail shop. The message of the present invention is not limited to the advertisement message but includes a general message such as an explanation, description, or counseling of an exhibition or commodity.

Conventionally, a poster, a sticker, a placard, a flag, a deformation display and the like, called a POP (Point Of Purchase) advertisement (to be referred to as "POP advertisement" hereinafter) have been widely used to emphasize the characters and advantages of commodities in front of, within or outside of a retail shop. The detailed explanation of the character of a commodity (commodity announcement) is given by a clerk (or clerks) present at a special set-up corner.

In recent years, a television integral-type video cassette recorder called "tele-video" is installed with which a video tape is repeatedly replayed to convey the impression of a commodity through television images. Alternatively, a television receiver or a plurality of television receivers are arranged to broadcast television images from a local broadcasting station instead of replaying a video tape. These apparatus for putting up a POP advertisement using television images are referred to as electronic POP apparatus.

The conventional electronic POP apparatus is, however, large in size and an installation space therefor is limited. In case of installing a plurality of television receivers, it is necessary to secure a large space, which is unfavorable for a retail shop wishing to display commodities as many as possible. Further, even if a placard and a flag are used along with the electronic POP apparatus so as to increase an advertisement effect, it takes time and labor to individually set up and install them due to their differences in advertisement form and the overall advertisement form tends to be complicated.

Quite recently, there are proposed, as described in Japanese Patent Publication (Japanese Patent No. 2921361), an advertisement display unit and a commodity display tool capable of producing a greater advertisement effect by integrating an advertisement medium of a placard and that of a television receiver with each other in a compact fashion and installing the resultant integral medium close to displayed articles such as commodities.

The first example of this advertisement display unit will be outlined as follows. An opening window is provided at a position opposing an image display panel on the front surface of a small-sized electronic image display apparatus for still images or television images, a display plate having an appropriate advertisement display is provided at an apparatus front side and an attachment which can be fixedly attached to a display case in which commodities or the like are displayed, is provided at an apparatus back surface side.

The second example of this advertisement display unit will be outlined as follows. A small-sized electronic image display unit for still images or television images is fixedly installed in a display case, a window section is provided at least on the front surface of the display case which surface opposes an image display panel on the front surface of the display unit, to which window section an appropriate advertisement display is provided, and an attachment which can be fixedly attached to a display section for displaying commodities or the like is provided at a display case back surface side.

Here, the small-sized electronic image display apparatus is provided with a reception antenna and performs an advertisement display operation based on an image signal or an image-and-sound signal by means of a radio transmission wave. Alternatively, the small-sized electronic image display apparatus performs an advertisement display operation based on an image signal or an image-and-sound signal from an image recording medium reproduction section by means of a wire transmission.

The apparatus which performs an advertisement display operation based on the an image signal or an image-and-sound signal by means of a radio transmission wave has, however, the following disadvantages. Namely, a transmitting station is required to constantly operate. It is difficult to display different contents according to the individual display apparatus. Power consumption is large. The image signal cannot be transmitted if a radio frequency noise occurs. In case of the latter apparatus which performs an advertisement display operation based on the image signal from the image recording medium reproduction section by means of a wire transmission, an image recording medium reproduction section involves a video cassette recorder, a laser disk player, a compact disk (CD) player, a floppy disk drive (FDD) unit and the like. Each of these recording medium reproduction sections has a drive unit such as a motor. Due to the provision of the drive unit, the recording medium reproduction section has disadvantages in that if the section is continuously used, the drive unit easily malfunctions and the medium is easily damaged, as well. Moreover, since the recording medium reproduction section is provided separately from an image display apparatus and they are connected through a wiring, there is a limit to an installation place.

As stated above, according to a promotion method employing the conventional electronic POP apparatus, it is difficult to discriminatingly advertise individual commodities in a showcase or on a display stand in or on which many similar competitive commodities are displayed.

Further, the conventional electronic POP apparatus can give a customer to an incentive to purchase the commodities by an interactive display of the information of the commodities in the form of a multimedia, such as a still image, moving image, character, graphic and/or sound. Though the electronic POP apparatus can provide more information than that obtained by touching or seeing the commodities, it has a problem not to order the commodities on that spot.

BRIEF SUMMARY OF THE INVENTION

Accordingly, it is a first object of the present invention to provide a message providing apparatus arranged close to or at an object article, for providing useful information on the article displayed on a display rack or a display stand and for explaining the article.

A second object of the present invention is to provide a message providing apparatus capable of interactively providing a message in accordance with a situation by adaptively combining a still image, moving image, character, graphic and/or sound instead of fixedly reproduce the recorded information, thereby appealing the customer of the message and responding to customers' questions.

A third object of the present invention is to provide a message providing apparatus for automatically starting or stopping the reproduction of the recorded information, thereby decreasing the burden of the user.

A fourth object of the present invention is to provide a message providing apparatus, commodity display apparatus, advertisement display panel, or advertisement display tool which can be combined with a display rack, a display stand, a display case, or a POP advertisement such as a flag or a display unit and facilitates developing a general advertisement and enhancing customers' interest in commodities and their attention to advertisement.

A fifth object of the present invention is to provide a message providing apparatus for reproducing a message stored in a storage medium detachable to the apparatus in which a reproduction of the message from a predetermined medium is only permitted and that from other medium is prohibited, thereby preventing illegal use of the message providing apparatus.

A sixth object of the present invention is to provide a message providing apparatus for reproducing a message stored in the apparatus in which a new message is delivered to a desired apparatus to update the message.

A seventh object of the present invention is to provide a message providing apparatus which can order the commodities on that spot while touching or seeing the commodities.

The first object is realized by a message providing apparatus in which a semiconductor memory storing message data containing at least one of a still image, moving image, character, graphic and sound is mounted, the message providing apparatus comprising sound output means for reproducing sound read from the semiconductor memory; and display means for displaying images, character or graphic read from the semiconductor memory.

The second object is realized by a message providing apparatus comprising means for storing plural message data containing at least one of a still image, moving image, character, graphic and sound; means for selecting one of the plural message data stored in the storing means; sound output means for reading a selected message data from the semiconductor memory and reproducing sound read included in the selected message; and display means for reading the selected message data from the semiconductor memory and displaying images, character or graphic included in the selected message.

The second object is also realized by a message providing apparatus in which a storing medium storing identification data thereof, message data containing at least one of a still image, moving image, character, graphic and sound and attribute data of the message data is mounted, the message providing apparatus comprising means for reading the identification data and the attribute data from the storing medium and selecting one of the plural message data stored in the storing medium based on the identification data and the attribute data; sound output means for reading a selected message data from the storing medium and reproducing sound read included in the selected message; and display means for reading the selected message data from the storing medium and displaying images, character or graphic included in the selected message.

The third object is realized by a message providing apparatus comprising means for storing message data containing at least one of a still image, moving image, character, graphic and sound; sound output means for reproducing sound read from the semiconductor memory; display means for displaying images, character or graphic read from the semi-conductor memory; and power control means for controlling power on/off of the apparatus.

The third object is also realized by a message providing apparatus comprising means for storing message data containing at least one of a still image, moving image, character, graphic and sound; sound output means for reproducing sound read from the. semiconductor memory; display means for displaying images, character or graphic read from the semiconductor memory; power control means for controlling power on/off of the apparatus; and control means for controlling an output volume of the sound output means or on/off of the display means.

The fourth object is realized by a commodity display tool comprising a cabinet portion having a commodity housed therein; and the message providing apparatus according to the present invention which is disposed integrally at the cabinet portion.

The fourth object is also realized by an advertisement display apparatus comprising an advertisement display section; and the message providing apparatus according to the present invention which is disposed integrally in the section.

The fifth object is realized by a message providing apparatus in which a storing medium storing identification data thereof, message data containing at least one of a still image, moving image, character, graphic and sound and attribute data of the message data is mounted, the message providing apparatus comprising means for reading the identification data and the attribute data from the storing medium and selecting one of the plural message data stored in the storing medium based on the identification data and the attribute data; sound output means for reading a selected message data from the storing medium and reproducing sound read included in the selected message; and display means for reading the selected message data from the storing medium and displaying images, character or graphic included in the selected message, wherein the attribute data includes data indicating message data validity, and the selecting means includes means for disabling reproduction of message data whose validity has expired.

The sixth object is realized by a message providing apparatus comprising means for storing message data containing at least one of a still image, moving image, character, graphic and sound; sound output means for reproducing sound read from the storing means; display means for displaying images, character or graphic read from the storing means; means for storing an identification data for identifying the apparatus; a receiving portion for receiving rewrite data of the message data; and means for judging weather or not the rewrite data is data to be destined to an own apparatus, and if the data is destined to the own apparatus, rewriting the message data stored in the storage means.

The seventh object is realized by the message providing apparatus according to the present invention comprising means for receiving an order from a customer.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 5A to 5E show a principle of displaying the message of the first embodiment;

FIG. 13 shows a reproduction control (permit/prohibit of reproduction) based on the ID in the first embodiment;

DETAILED DESCRIPTION OF THE INVENTION

A preferred embodiment of a message providing apparatus according to the present invention will now be described with reference to the accompanying drawings.

First Embodiment

Figure 1:
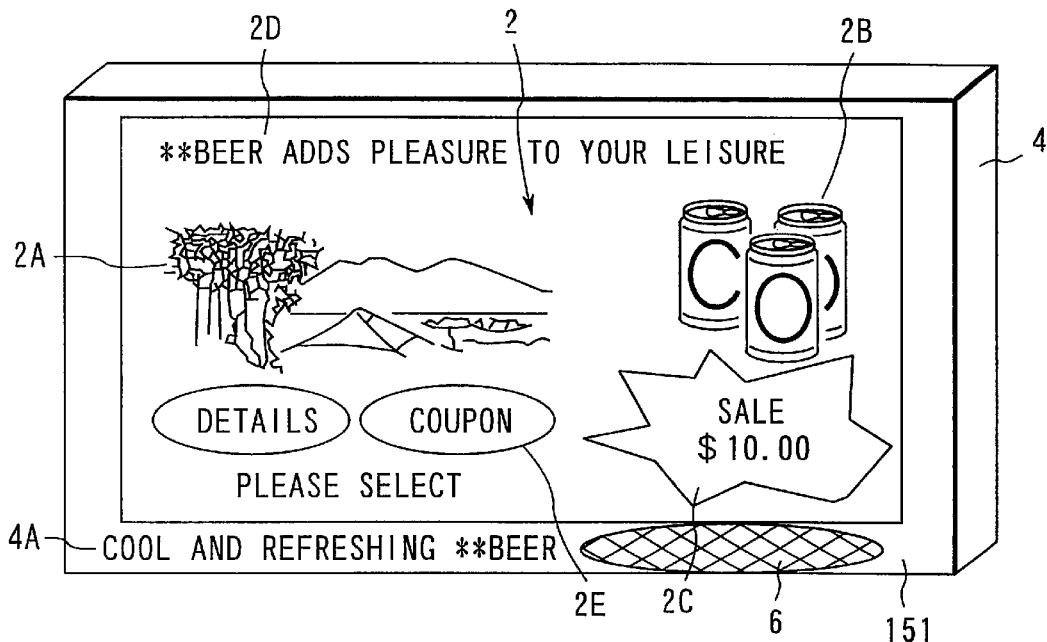
FIG. 1 shows an external appearance of an electronic POP apparatus as a first embodiment of a message providing apparatus according to the present invention.

FIG. 1 is a schematic view showing an external appearance of an advertisement providing apparatus (electronic POP apparatus) as the first embodiment of a message providing apparatus according to the present invention. The advertisement providing apparatus has, as a main constituent element, a display 2 of which cabinet 4 is provided with a speaker 6. If the advertisement providing apparatus is used in the distribution industry, it is preferable to form the display 2 by a small-sized flat display (for example, having an image frame of 3.5 inches) or the like in order not to conceal commodities in a display rack when it is placed in the rack in front of the commodities. The flat display 2 includes a passive display of an illumination type (a planar back-light source or a room light source) or an active display of self illumination type. Normally, a liquid crystal display (LCD) apparatus of an illumination type is used as the flat display 2. However, it is possible to use an active display such as a cathode ray tube (CRT) display or a plasma display, or an organic or inorganic electro-luminescence (EL) display as the flat display 2.

Figure 2:
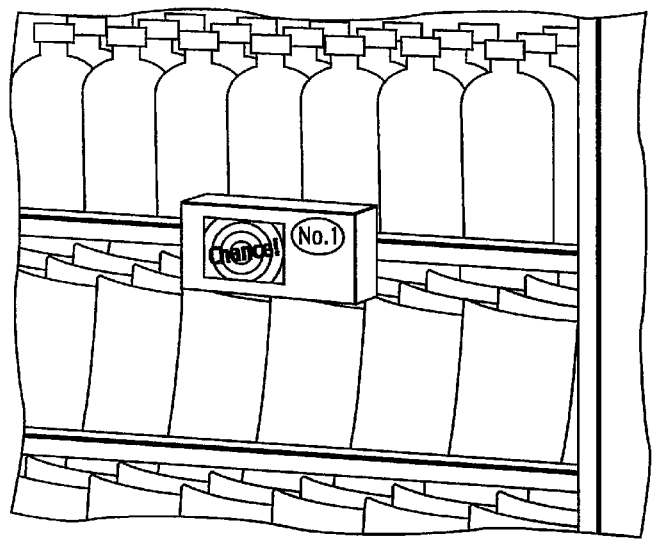
FIG. 2 shows a first use example of the first embodiment.

FIG. 2 shows an example of the arrangement of the advertisement providing apparatus according to the F first embodiment on a display rack of a detergent. The apparatus is compact in size and it does not, therefore, lessen the visibility of commodities and hamper customers from touching them.

Figure 3:
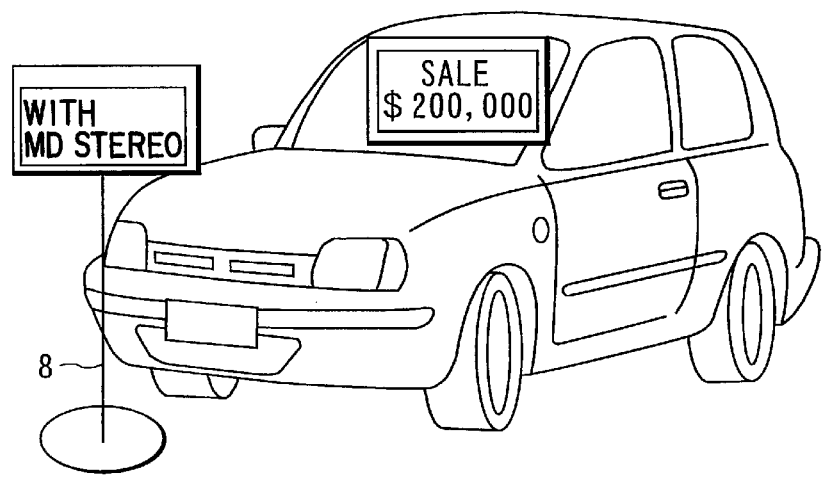
FIG. 3 shows a second use example of the first embodiment.
Figure 4:
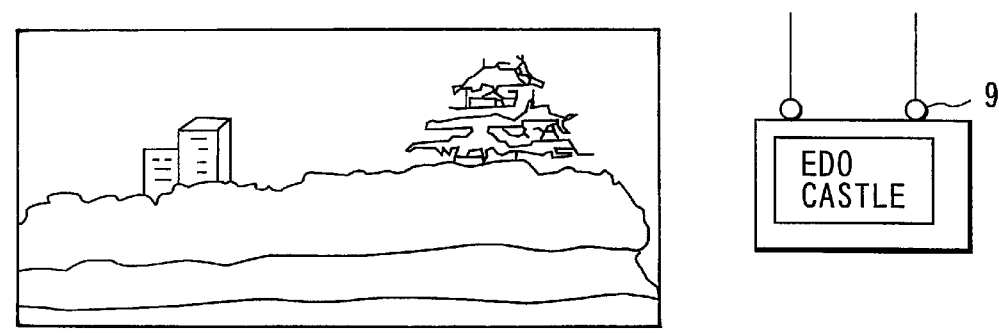
FIG. 4 shows a third use example of the first embodiment.
Figure 5A:
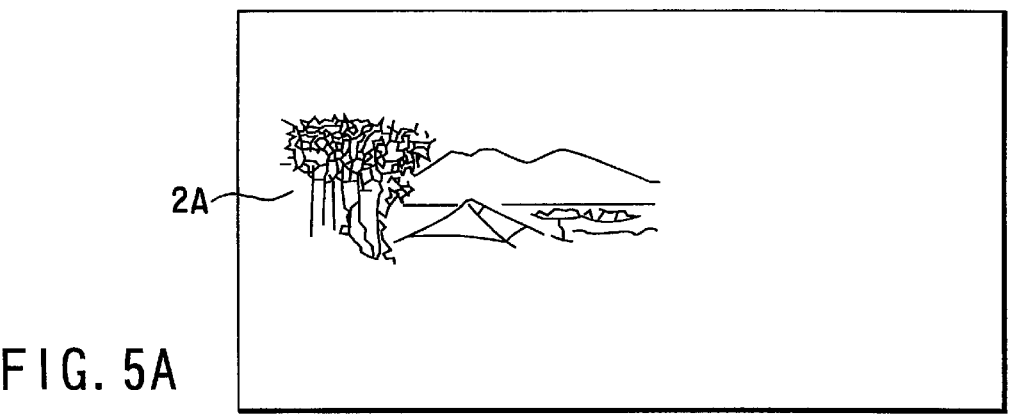
Figure 5B:
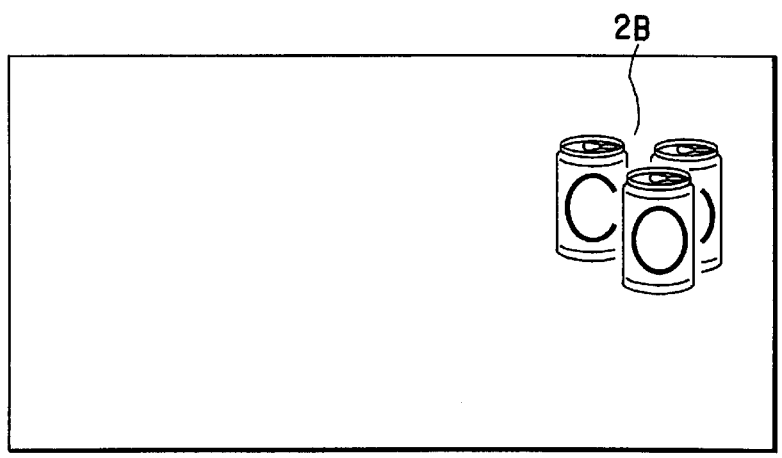
Figure 5C:
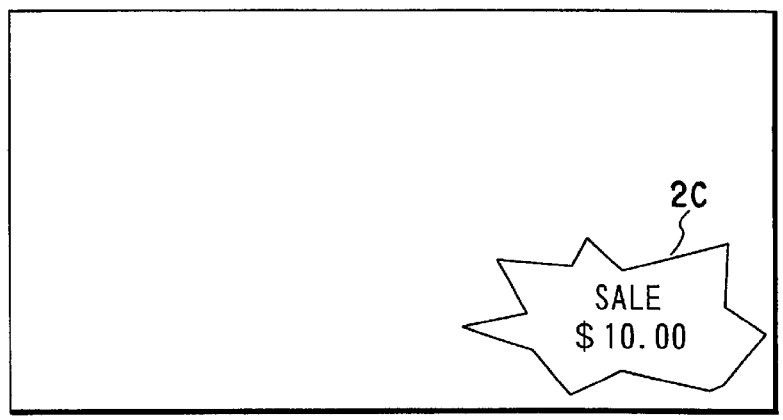

However, the present invention is not limited to the above-mentioned small-sized display. The size may be increased to some extent, such as 10 inches depending on the situation. Examples of the large-sized display are shown in FIGS. 3 and 4. Unlike the conventional television receiver, the apparatus in this embodiment is planar so that it is possible to install the apparatus in the display rack or display table or in the vicinity of a large commodity such as a motor vehicle or refrigerator without requiring a large space even if it is large sized. Therefore, the commodities are not concealed. In order to allow arranging the apparatus on a display rack, on a display stand, at a large-sized commodity or on a wall, the center of gravity of the apparatus is set low and the bottom of the apparatus is flattened in case of arranging it, for example, on a rack or a stand. As shown in FIG. 3, an installation tool 8 such as a U-shaped tool or a tripod tool may be provided separately. If the apparatus is attached to the motor vehicle, the refrigerator or the like, it may be attached thereto by the magnetic force of a magnet or the like or the attraction force of a suction cap or the like. Furthermore, the apparatus may be adjusted by changing the angle of the image plane according to the position or height of an installation place so that commodities can be clearly seen.

If a commodity is a image or the like, holes or suspension tools 9 for suspending the apparatus from an attachment attached to a wall or the like may be provided as shown in FIG. 4.

The speaker 6 includes a monaural or stereo speaker of conductive type, electromagnetic type, electrostatic type or piezoelectric type. It is effective that the speaker 6 has directivity so that only the customer approaching the advertisement providing apparatus can hear sound, which is also preferable with a view to generating less noise around. If plural apparatus are arranged at respective racks in a store, sounds from respective apparatus interfere with each other thereby degrading an advertisement effect.

Display is effected by superposing plural layers or planes. As shown in FIGS. 5A, 5B, 5C, 5D and 5E, a moving image 2A showing a landscape, still image 2B showing a commodity, POP image (still image) 2C showing a price, characters 2D showing a catch phrase and characters 2E showing a touch panel are individually stored as layer data in a memory and the layers of data are superimposed on the others and thereby composed. In case of making an animated cartoon, for example, image cells for cartoon characters and those for backgrounds are prepared separately and they are superimposed on the others. The present invention carries out this superimposition processing in an electronic POP. Thus, it is possible to easily provide different advertisement only if the combination of layer data is changed or at least one layer data is changed to another one. If plural POP image layers 2C or character layers 2D are prepared for different time of day or day of week, a suitable catchphrase or price can be displayed in accordance with time of day and day of week. It is also possible to change the moving image layer 2A.

Each image layer is assigned with the layer number and is controlled with its layer number. The layer data can be independently controlled on/off. The layer data may include sound data layer so that the different advertisement is effected by replacing the sound layer with another sound layer or the same sound layer can be linked with plural advertisement program data.

As shown in FIG. 1, the cabinet 4 of the display 2 also includes advertisement characters 4A.

Figure 6:
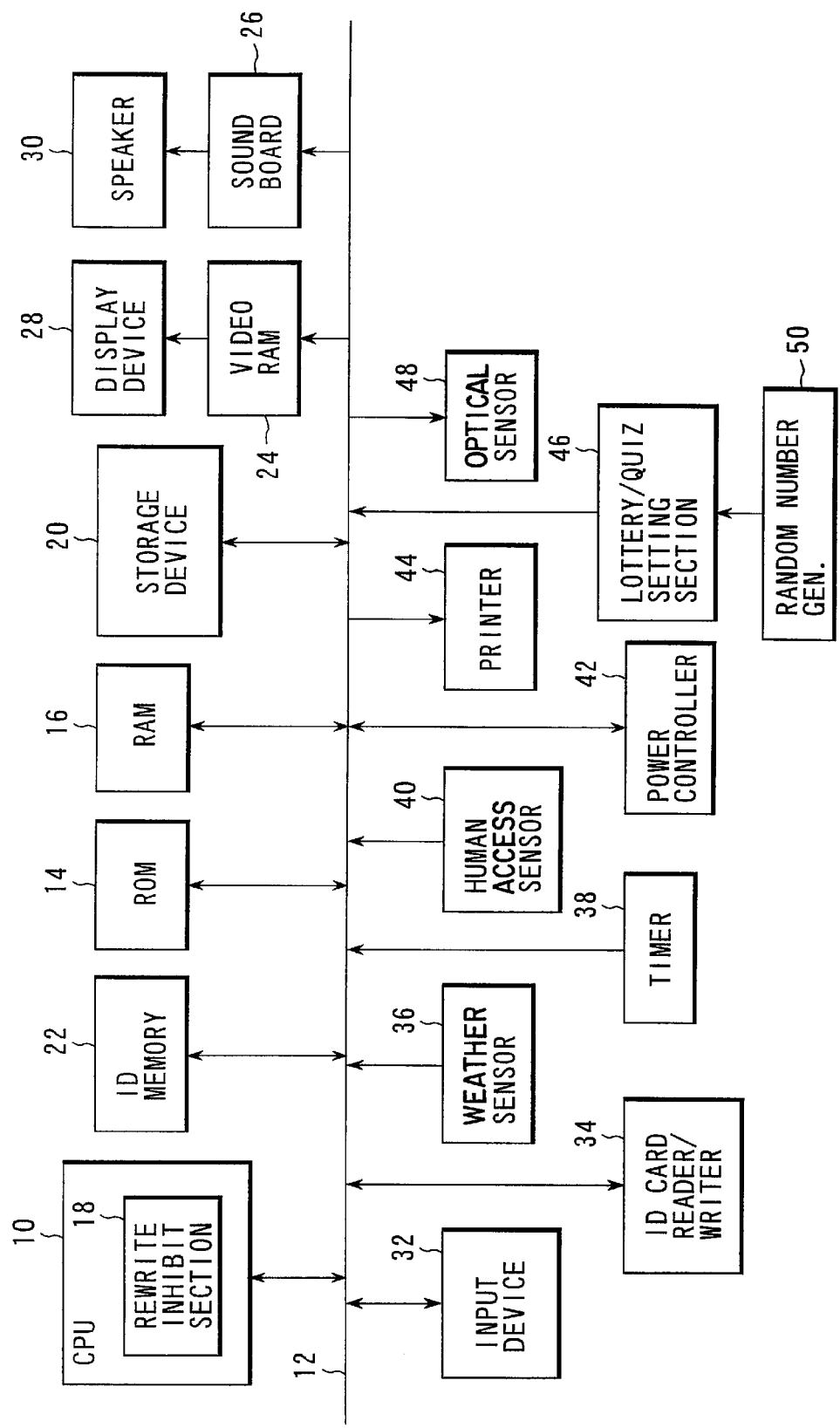
FIG. 6 shows a block diagram of the first embodiment.

FIG. 6 is a block diagram showing the circuit arrangement of the advertisement providing apparatus of the first embodiment shown in FIG. 2. An ROM 14 storing computer programs of providing advertisement and the like and an RAM 16 serving as a work memory are connected to a CPU bus 12 of a CPU 10 which controls overall processing. The CPU 10 includes a rewrite inhibit section 18 of the advertisement data described later. A storage apparatus 20 storing layer data of image, character and sound about an advertisement to be provided from an advertisement provider, ID memory 22 storing ID information to check a relation between the advertisement providing apparatus and a storage medium of the storage apparatus 20 described later, video RAM 24 as a display controller and a sound board 26 for outputting sound are also connected to the CPU bus 12. A display apparatus 28 is connected to the video RAM 24. A speaker 30 with amplifier is connected to the sound board 26. It is noted that the apparatus in this embodiment may not be controlled by the CPU 10 based on software running by a program but by a hardware logic.

The storage apparatus 20 may include a video cassette recorder, hard disk drive and nonvolatile semiconductor memory apparatus such as a flash memory. The storage apparatus 20 using the semiconductor memory can be small sized and operated under a small power consumption. Further, it can be continuously operated for a long time since it has not a mechanical section, such as a motor. The semiconductor memory can be formed in a chip shape and fixedly installed to the apparatus. It can be formed in a card shape and removable to the apparatus. When the removable memory card is used, it is possible to change the advertisement program by exchanging the card with a new one or rewriting the contents of the card by a data writer after the card is removed from the apparatus. Since the capacity of the card is small, it is preferable to install plural memory cards in the apparatus in order to increase the storage capacity. In this case, advertisement data is selectively read from the cards. Further, it is possible to fixedly install the semiconductor memory in the apparatus and the contents thereof are updated based on an externally supplied data, as described later.

If the semiconductor memory is used as the storage apparatus 20, an advertisement program can be reproduced by only reading data from the memory. It is not necessary to use an external reproducing apparatus such as a video cassette recorder so that it is possible to integrate the reproducing apparatus and the display apparatus, thereby reducing the entire size. The reproducing apparatus without a mechanical section can be unlimitedly operated for a long time. Since the recording medium is not damaged, a quality of the reproduced signal, the image quality or sound quality is degraded. Further, the running cost is low due to a low power consumption.

The conventional advertisement providing apparatus includes a television receiver and display apparatus are required so that a dedicated area is needed. However, the advertisement providing apparatus of the present invention does not necessitate such an area and can be placed on the display rack or table as well as the commodities. Since the advertisement providing apparatus of the present invention has a small display, it is possible to provide image and sound information such as TV commercials familiar to consumers at the place close to the commodities displayed in the shop. It is made possible to display original images for showing instructions, an example of usage, an example of how to cook a commodity and the like which have been conventionally difficult to show through existing sales promotion tools, paper media, short-time TV commercials. Since the apparatus is compact in size, it is fitted to any display racks and corners, from a refrigerator to a basic item, put in any places in the shop and advertisement campaign can be developed in cooperation with TV commercials for wide variety of commodities. Since the apparatus allows attracting customers by images and sound, it is possible to produce a powerful eye-catching effect. The apparatus can be installed in a fixed rack in a limited space and it effectively allows switching the brand of fixed commodities by emphasizing the discrimination of the commodities from competitive ones.

Figure 7:
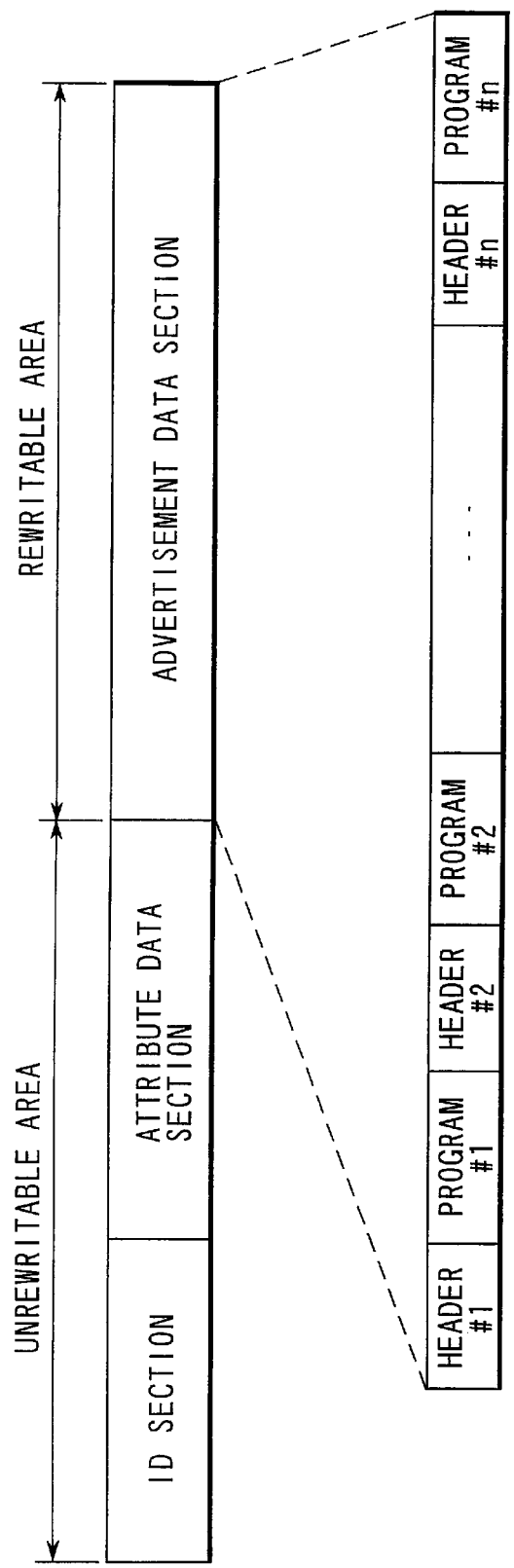
FIG. 7 shows a memory map of the storage apparatus in the first embodiment.

FIG. 7 shows a memory map (data structure) of the storage apparatus 20. A memory space is divided into an unrewritable area and a rewritable area. ID data and attribute data are written in the unrewritable area, and advertisement data to be provided is written in the rewritable area. The advertisement data consists of a number of sections, and each section consists of a header and entity data (program data: layer data). As described later, the present invention includes a mechanism which enables a problem to be selected or changed according to a situation, and stores program data of a plurality of categories regarding same commodities.

ID data is transferred from a memory card to the advertisement providing apparatus mainframe. The ID data is provided to specify the memory card and the apparatus in which the ID data has been transferred from a memory card for the purpose of various controls. A variety of ID data is assumed. When a distributing company (retail shop) mainly uses this advertisement providing apparatus, the following IDs are used.

(1) Customer ID
This is a unique number assigned by customer
(2) Application Type ID
This ID distinguishes the category or application type of customer.
The category indicates whether the customer is a manufacturer, lease industry, distributing company, or rental company; and the application type indicates lease, rental or demonstration.
(3) Setup Area ID
This ID distinguishes an area (Hokkaido, Tokyo, Kyushu, etc.) where the apparatus is set up.
This ID is provided because timings (periods) for providing same programs are different depending on commodities to be advertised or area.
(4) Setup Place ID
This ID distinguishes a place where the apparatus is set up (store name, show room name, etc.)
(5) Setup Place Internal Area ID
This ID distinguishes an area (4F, 3F, 2F, etc.) in the setup place.
This ID is provided because floors are different depending on the setup area.
(6) Setup Place Internal Subsidiary Area ID
This ID distinguishes a subsidiary area in a narrower range (gentlemen's wear space, children's wear space, toy space, etc.) of the area in the setup place.
This ID is provided because a plurality of categories (spaces or the like) are provided in the same area (floor or the like) depending on the setup place.
(7) Apparatus Number ID
This ID distinguishes a mainframe number of apparatus (apparatus 3, apparatus 2, apparatus 1, etc.).
This ID is provided because a plurality of apparatuses are set up in the same area and the same category depending on the setup place.
The customer ID is indispensable, but the other IDs are used if required or may not be used.
The present invention can set ID data and mask data which can specify whether ID data setting is valid or invalid. In general, masking is set to off, and ID setting is valid. When masking is set to on, the setting of the corresponding ID can be invalidated. For example, when the masking of setup area ID is set to on, it can be set to all areas irrespective of setup area. If this masking function is not provided, all setup area IDs must be set in order to set to all areas, and this work is very hard. In the case where the ID consists of a plurality of digits, masking consists of a plurality of digits accordingly. The ID setting may be enabled/disabled every ID digit.

The attribute data include the following:
(1) Date/Time
This indicates the date/time of reception and transmission of ID data or advertisement data.
(2) Size
This indicates advertisement data size.
(3) Moving Image, Still Image, Character, Graphic, and Sound
Enable/disable. When this is set to "enable", it indicates a rewrite instruction if required.
(4) File Name
This indicates a name of an advertisement data file such as commodity name or advertisement name.
(5) Calendar/Timer
Enable/disable. When this is set to "enable", it indicates a rewrite instruction if required.
(6) Calendar and Timer Date/Time
This indicates the creation date and time of calendar and timer.
(7) Program
Creation date and time, enable/disable. When this is set to "enable", it indicates a rewrite instruction if required.
(8) Contents of Program
This indicates a program data file name.
(9) Validity of Advertisement
This indicates the advertisement validity of advertisement data.
(10) Acknowledgement
This indicates an acknowledgement of advertisement data reception.
(11) Maintenance/Failure Check
This indicates an occurrence of a failure or operation state of apparatus or data representation/operation.
(12) Marketing
This indicates enable/disable of marketing information and rewrite instruction such as how many peoples passed in front of equipment or how many peoples touch the screen, etc.

Entity data (program data) #1 to #n consists of layer data such as moving images, still images, characters, graphics or sounds, as described in the first embodiment.

Another specific example of attribute information is shown below. This indicates the capacity of the entire memory, manufacturer/production (or selling company name or service providing company, etc.) and medium type information. For example, the following information is set.
Manufacturer: XX electric company
Capacity: 16 Mbytes
Medium type: Smart media
Customer name; YY trading Co.
Customer code: 0001
Store name: ZZ branch office
Store code: 0003
Product name: Chocolate
Product code: 1034

These ID data, attribute data, and program data are subject to security processing such as predetermined encrypting, scrambling, electronic watermarking, and processing such as decrypting, descrambling or watermark removal may be done depending on a CPU.

Referring now to FIG. 6, image information, character information, graphic information, or sound information is read from the storage apparatus 20 in accordance with a program stored in the ROM 14, and processing such as presenting the read information to the customer as an advertisement by composing or combining the information is performed. The CPU 10 performs processing for outputting image information displayed on the display apparatus 28 and sound information output from the speaker 30. The CPU 10 incorporates a power on play function for automatically starting reproduction of data stored in the storage apparatus 20 when the power is supplied. In addition, it incorporates an auto replay function for automatically restarting reproduction when all data has been reproduced. The CPU provide a power on play for starting reproduction just by turning on the power, and an auto replay for automatically repeating reproduction. Thus, clear image and sound can always be repeatedly reproduced without any interval and specific operation, makes maintenance free and preventing an increased burden of clerk. A high eye catch effect can be obtained because appealing is done with image and sound. Instead of controlling entire operation by the CPU 10 on the base of software operated by a program, the present invention may be arranged so as to be controlled by hardware logic such as ASIC.

The video RAM 24 drives the display apparatus 28, and displays image information, character information, and/or graphic information. The sound board 26 drives the speaker 30, and reproduces sound information.

To the CPU bus 12, there are further connected an input device 32, an ID card reader/writer 34, a weather sensor 36, a timer 38, a human access detecting sensor 40, a power controller 42, a printer 44, a lottery/quizzing apparatus 46, and an optical sensor 48.

Now, each function will be described below. These functions must not be always included, can be arbitrarily selected, and may be provided by a user if required.

The timer 38 controls the power controller 42 in accordance with a predetermined time schedule, and causes the apparatus to be automatically turned on and off. That is, the present advertisement providing apparatus issues an instruction to the power controller 42 when the time for the store to start operation has come by causing the timer 38 to set information such as operation start time, end time, holiday or the like. Then, the entire apparatus is powered on, thereby starting reproduction of the data stored in the storage apparatus 20. When the time of ending operation has come, the entire apparatus is powered off. In this manner, even if a number of advertisement providing apparatus are set up in shop, a work of turning on/off the power supplies while clerk is walking in the store is eliminated, and a burden on the store side is reduced. Therefore, advertisement information helpful for the customer is provided, and substantial reduction of labor and electric power can be achieved without requiring manual power supply operation.

The optical sensor 48 is provided to control power on/off according to a change in apparatus setup environment (luminescence). This is because the holidays of the stores are irregular, thus making it difficult to causing the timer 38 to preset the date/time of operation. Therefore, in the case where the brightness of the optical sensor 48 is set to a first predetermined value or more for a predetermined period of time, the illumination of the store is lit, and it is determined that the time of starting operation has come. In the case where the brightness is set to a second predetermined value which is equal to or less than the first predetermined value for a predetermined period of time, the illumination is turned off, and it is determined that the time of ending operation had come. Then, the power supply can be automatically turned on/off. In this manner, this advertisement providing apparatus can be reliably actuated only for a predetermined operation period of time.

In addition to controlling power on/off, when it is unnecessary to turn on the power supplies of the entire apparatus, only display and sound output may be turned on when necessary from the off position. In order to achieve this, a human access detecting sensor 40 is provided. The human access detecting sensor 40 includes a infrared-ray sensor, an ultrasonic sensor, a temperature sensor or the like. In this manner, when nobody is near the place, operation is suspended; and when somebody comes near the place, advertisement providing can be restarted instantaneously. The sensor 40 can adjust sensitivity, sensing direction, range or the like arbitrarily, and can improve the degree of freedom in store corridor size or setup method.

After the display is always set to on, a low volume of sound is output, thereby appealing a distant customer, and the volume may be increased when the customer comes near the place. Further, after only characters, graphics and a still image are always displayed, moving images may be displayed when a customer come near the place.

Thus, the human access detecting sensor can detect the access of the customer, performs controls such as increasing or decreasing the volume according to the presence or absence of human or reproducing a specific image or images according to the human access, and meet the usability of clerk in the store, the evocation of note to users and the usability of the users. In a show room or the like, commercial message music is generally reproduced with low volume, but the presence of advertisement providing apparatus can appeal to pedestrian by sensing the human access, and increasing the volume. In an almost empty show room, it is generally quiet, and it sounds bothersome for clerk when a plurality of advertisement providing apparatus generate sounds with high volume.

The weather sensor 36 consists of a thermometer, a hygrometer, a barometer, a wind vane or the like, and detects weather. The weather information acquired from the weather sensor 36 is processed by the CPU 10, and the program information is properly selected and read from the storage apparatus 20 according to the weather.

It is assumed that the advertisement program data different depending on the weather concerning the same commodities are recorded in the storage apparatus 20. This is because, in particular, in the retail shop, the customers are different depending on the weather, and popular commodities or commodities placed on the shelf or base are different depending on the weather. Therefore, according to the advertisement providing apparatus of the present embodiment, there can be provided an advertisement program according to the weather, and a higher advertisement effect can be achieved. In the case where more detailed weather is required, the weather information may be properly input from the input device 32 such as touch panel. Alternatively, instead of providing the weather sensor 36, more detailed weather information may be acquired from television broadcasting, radio broadcasting, or weather information provider wirelessly or via wire.

In addition, advertisements are preferably different depending on time, customers without being limited to weather. Thus, the storage apparatus 20 stores advertisement program data different depending on time regarding to the same commodities. If an attempt is made to change an advertisement, the user causes the timer 38 to preset the contents of date/time and change of the target advertisement. When the timer 38 detects the set time, it transmits a change signal to the CPU 10. Then, the CPU 10 properly selects and reads program information from the storage apparatus 20 according to this instruction. This is because, in particular, in the retail shop, customers and popular commodities are different depending on the operation time or popular commodities. Therefore, according to the advertisement providing apparatus of the present embodiment, there can be provided an advertisement program according to the time, and a higher advertisement effect can be achieved.

Further, a customer is requested to have a customer card such as non-contact type IC card having the customer ID recorded therein, and the access of this customer card is detected, whereby the contents of advertisement may be changed. In order to achieve this, the storage apparatus 20 stores different advertisement program data concerning commodities depending on customers, and the ID card reader/writer 34 is provided. When clerk accesses the place, no response is provided, which is not bothersome to clerk. Further, the contents of advertisement may be changed according to a respective one of the customers. In recognizing customers, in addition to detection using the customer card, the customer's gender and age or the like is estimated from the customer's sound so that the advertisement information may be properly provided according to the customer. For example, a coupon may be output from the printer 44 to a membership customer only in response to a non-contact type IC card which is allowed to be owned by the membership customer. Alternatively, specially priced commodities or services may be provided (notifying the validity of the customer's card or the like). In addition, coupon information or point addition can be performed in the IC card memory by means of the ID card reader/writer 34. Further, ID of the non-contact type IC card is read, whereby marketing data concerning customers who operated this terminal, how many peoples stood in front of the advertisement providing apparatus or did this and that can be acquired. In addition, this IC card may be a contact type IC card without being limited to a non-contact type card.

There is no need for the storage apparatus 20 to store data in which the entire programs differ depending on the weather, time, customers, and providing only data of the difference layers will suffice. The above sensors 36, 40, and 48 and timer 38 may be connected separately to the mainframe via wire or wirelessly in stead of incorporating them into the electronic POP equipment main frame.

The input device 32 such as touch panel is used in the case where a user instructs program selection as well as in the case of the aforementioned weather input. The touch panel 32 provided in front of the display section 28 is also connected to the CPU bus 12, and the CPU 10 displays a touch key 2E on the screen of the display section 2 as shown in FIG. 1. The input device 32 may be configured by button keys, keyboard or the like without being limited to such touch panel. The input device 32 is provided so that the customer inputs a variety of instructions to the present advertisement providing apparatus. The input device 32 may be provided integrally with the advertisement providing apparatus or may be provided separately.

The input device 32 using button keys has high operability so that an aged customer can input a variety of instructions smoothly without any problem. Further, the input device using touch panel can adopt an advertisement space widely when an advertisement is provided on the mainframe surface of the advertisement providing apparatus, and contributes to its miniaturization.

In the present embodiment, the storage apparatus 20 stores advertisement data with their different degree of detail concerning identical commodities so that the customer can acquire, display, and sound-output advertisement information or price reduction information of desired degree of detail and the like.

Therefore, sets of optimal commodity information corresponding to customers can be efficiently presented by combining the sets of information. In addition, the input device 32 may be used for answering questions. Further, with a keyboard, the advertisement provider can create an advertisement program by means of the input device 32, can properly input character information (catch phrase, price, operation time or the like), and can rewrite and change advertisement data.

Figure 8:
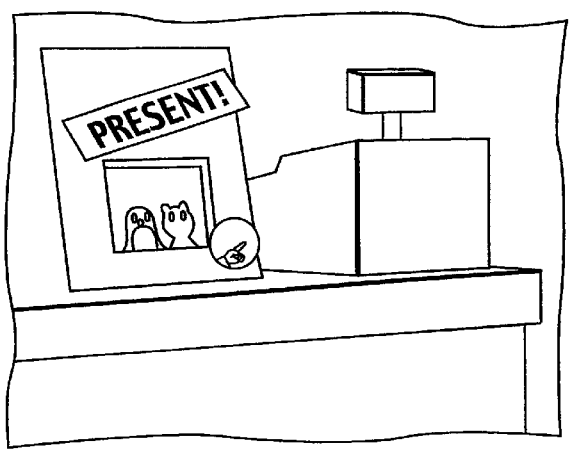
FIG. 8 shows a fourth use example of the first embodiment.
Figure 9:
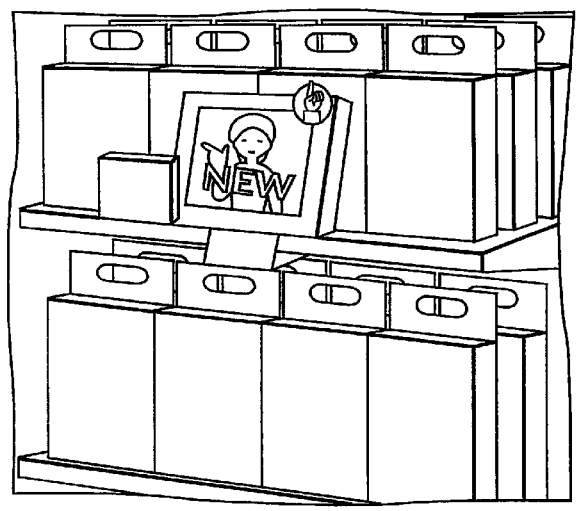
FIG. 9 shows a fifth use example of the first embodiment.
Figure 10:
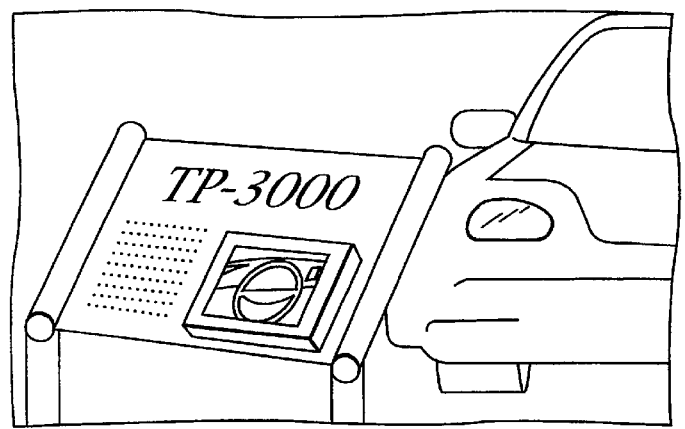
FIG. 10 shows a sixth use example of the first embodiment.

Examples of allocation of the advertisement providing apparatus with touch panel are shown in FIG. 8 to FIG. 10. FIG. 8 shows an example when the advertisement providing apparatus is used as a counter panel by enlarging a frame section. FIG. 9 shows an example when the apparatus is provided at a gondola end. FIG. 10 shows an example when the apparatus is provided in s show room in order to interactively answer questions from customers about the commodity.

In this manner, the input device 32 is provided, whereby a request or instruction of a customer can be input, a program required by the user can be interactively provided, useful advertisement information such as direct mail corresponding to customers can be individually provided.

The printer 44 is a thermal printer using heat sensitive paper, a page printer using a toner, an ink jet printer blowing ink, or solid ink type printer.

The print colors may be either of monochrome or color, and are preferably bright colors from the aspect of appearance or advertisement effect.

By using the printer 44, the customer can acquire desired advertisement information as a printing matter, which is helpful for the customer to understand the commodities. In addition, advertisement information to be printed includes the contents of advertisement (commodity information, application/cooking method, and questionnaire or the like); money certificate such as price reduction tickets or commodity tickets; or winning prizes such as lottery or coupon tickets. Providing these sets of information to customers improves audiovisual ratings of the advertisement providing apparatus, strengthens a relationship between the customers and retail shops or commodity manufacturers, enhances the understanding of commodities, and improves service.

These sets of information not only is printed on paper, but also may be stored as service data such as coupon or stamp in an IC card owned by the customer (irrespectively of contact or non-contact type card) by means of the card writer 34.

By providing the printer 44, information on advertisement information, advertisement related information, price reduction tickets, money certificate, price reduction tickets is printed so that the customer can deepen the understanding of commodities, and the advertisement providing apparatus which improves audiovisual ratings and contributes to sales promotion can be provided.

A random number generator 50 is connected to the lottery/quizzing section 46. The random number generator 50 generates random numbers properly according to time or external factors. The lottery/quizzing section 46 selects a lottery/quiz from the advertisement information based on the generated random number, and outputs the selected lottery/quiz. An answer to the lottery/quiz is preferably performed by the input device 32 on the spot.

Special service or winning prizes and the like can be provided to customers according to the lottery result or quiz answer rate. For special service and winning prizes, commercial message which is not provided in mass media such as television or radio may be output from the display apparatus or speaker or the money certificate or price reduction certificate and the like printed according to the answer rate or the like may be changed. In this manner, advertisement information useful for customers or amusement service related to such advertisement information can be provided. Therefore, there can be provided the advertisement providing apparatus wherein the audiovisual ratio of the customers is improved, service is improved at a retail shop, the apparatus being capable of contributing sales promotion and significantly distinguishing commodities or retail shops.

Now, several operation examples specific to a case in which a detachable medium (for example, memory card) is used as a storage medium will be described below. As described above, although the present invention may be a hard disk, a video tape or the like without being limited to a memory card when it is employed as a storage medium, the present invention is presumed to be a detachable storage medium when the following operations are performed.

Figure 11:
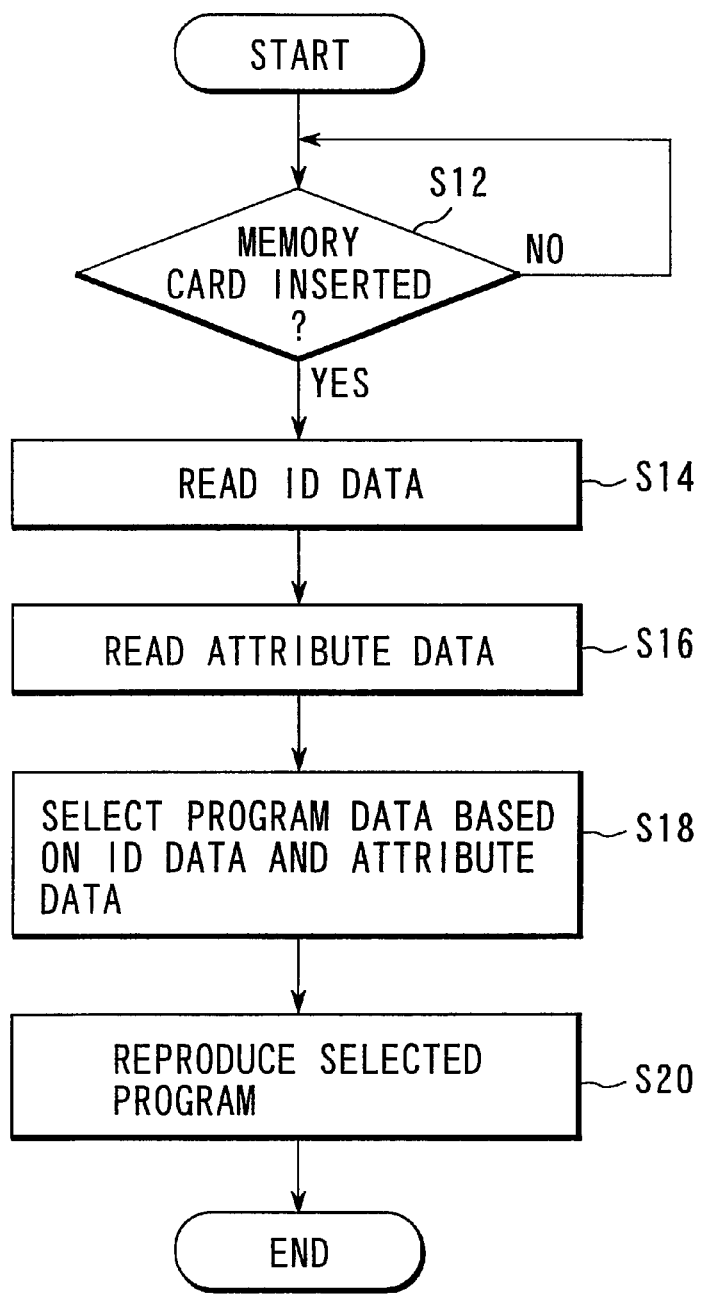
FIG. 11 is a flowchart showing an operation of the first embodiment.

FIG. 11 shows an example of automatically starting reproduction according to the mounting of a storage medium.

First, in step S12, the CPU 10 determines whether or not a memory card is mounted on the storage apparatus 20. When the card is not mounted, the CPU 10 waits until it has been mounted. When the mounting is detected, ID data is read from the memory card in step S14, and attribute data is read from the memory card in step S16. In step S18, a program according to the ID data and attribute data is selected from among the programs of #1 to #n stored in an advertisement data section. In step S20, the selected program is reproduced As has been described above, according to an operation example of FIG. 11, a customer can provide advertisement information without cumbersome instruction or operation merely by mounting a memory card having ID data and attribute data written therein to the present advertisement providing apparatus.

Conversely, from the viewpoint of the advertisement provider, a user of the advertisement providing apparatus according to the present embodiment can unavoidably set information stored in a storage medium (such as memory card) so as to correctly use the information. An amount of charge for using advertisement information is added to sales amount or lease charge of the storage medium (such as memory card), whereby advertisement with charge can be provided. In this manner, in addition to advertisement information, attribute data on advertisement information which is cumbersome in management is provided, whereby advertisement information can be easily managed.

In the case where advertisement providing service with charge is thus provided, if ID data or attribute data in a storage medium (such as memory card) is falsified, there is a danger that data is illegally fetched or an advertisement not intended by the advertisement provider is provided. However, according to the present embodiment, in the write disable section 18 incorporated in the CPU 10, an area for storing ID data and attribute data of the memory card is provided as a unrewritable area, whereby falsification of ID data and attribute data can be prevented, and illegal fetching of data can be reliably prevented.

A read-only memory area (ROM area) is additionally provided, whereby ID data and attribute data is stored in this ROM area, thus making it possible to prevent data falsification. In the present embodiment, an area for storing the ID data and attribute data in the storage apparatus 20 is generally provided as a unrewritable area. However, in the case where a predetermined release instruction (for example, password entry or use of a rewrite-only apparatus and the like) is issued, the advertisement provider can adopt a service providing form in which a storage medium (such as memory card) is recollected, and sales or lease is performed after ID data and attribute data has been rewritten.

Figure 12:
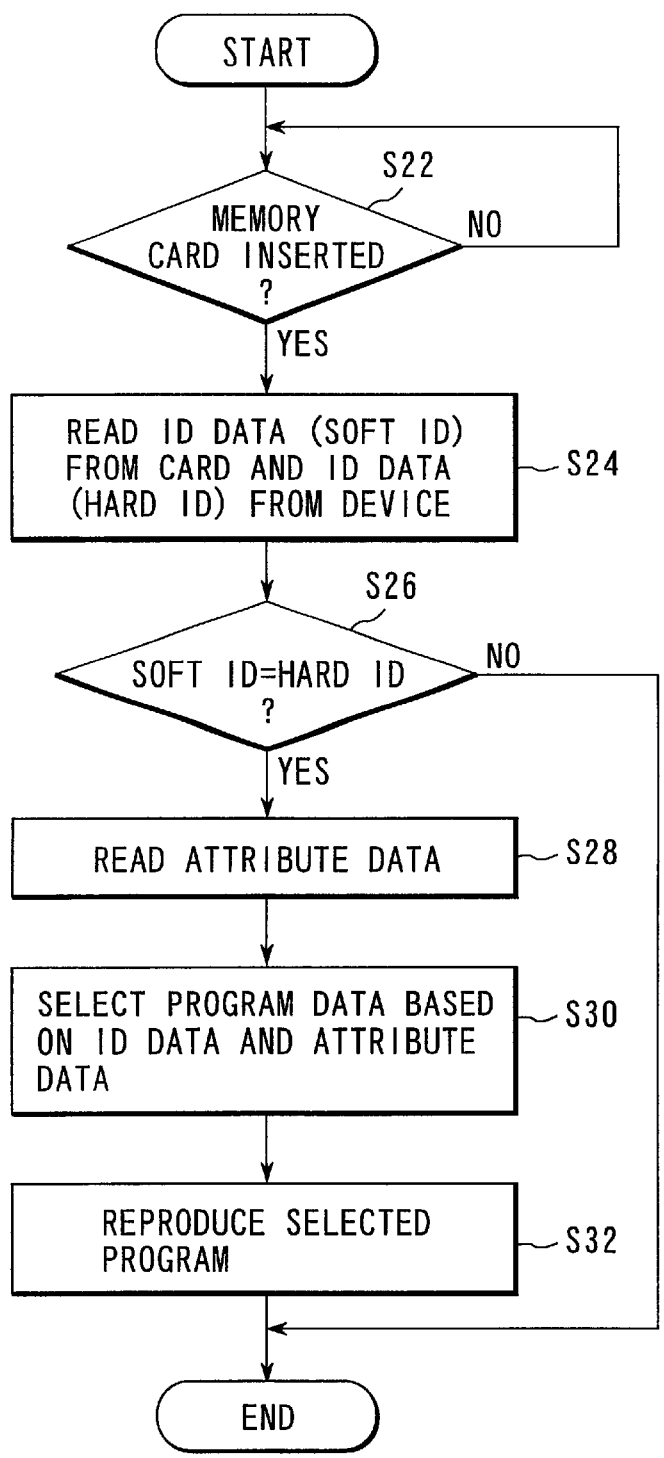
FIG. 12 is a flowchart showing another operation of the first embodiment.

FIG. 12 shows an operation concerning check of correlation between a detachable storage medium and the apparatus mainframe. In the figure, the apparatus cannot rewrite memory card data. In order to rewrite the data, it is necessary to temporarily remove the memory card from the apparatus, and rewrite the advertisement program data by means of another card writer. Therefore, another manufacturer pulls a memory card of such another manufacturer from the advertisement providing apparatus installed in a retail shop, and replaces the memory card with an own memory card, whereby advertisement can be supplied by adversely using another apparatus. Alternatively, when a clerk in a retail shop mounts a memory card on the apparatus, the clerk may mount a memory card of one manufacturer incorrectly on the apparatus set up by another manufacturer. FIG. 12 shows an example when illegal or incorrect mounting of these memory cards is prevented.

First, in step S22, the CPU 10 determines whether or not a storage medium such as memory card is mounted on the recording apparatus 20. In the case where such storage medium is not mounted, the CPU 10 waits until it has been mounted. When the mounting is detected, ID data (software ID) is read from the memory card, and ID data (hardware ID) is read from the ID memory 22 of the apparatus mainframe. Presumably, the user of the advertisement providing apparatus presets a correlation between the memory card and the apparatus mainframe to the apparatus mainframe. That is, in the case where a manufacturer sets up the apparatus in a retail shop, the own ID must be written in the ID memory 22 prior to setup. This is accomplished by transferring ID data from the storage apparatus 20. In addition, when a card deposited from a retail shop manager is first mounted on the own installed apparatus, the ID data is transferred from the storage apparatus 20 to the ID memory 22. In step S26, it is determined whether or not software ID coincides with hardware ID. If these IDs do not coincide with each other, the memory card indicates that the apparatus cannot perform reproduction, and operation terminates. When both of these IDs coincide with each other, attribute data is read from the memory card in step S28. In step S30, a program is selected according to ID data and attribute data. In step S32, the selected program is reproduced.

As has been described above, according to the present embodiment, advertisement data read from a memory card is prevented from being reproduced unintentionally. For example, assume that advertisement providing apparatus purchased by a number of manufacturers, respectively, are brought, and coexist in shop of XYZ company. The advertisement providing apparatus purchased by AAA manufacturing company must reproduce only its own software (advertisement data), and must not produce software (advertisement data) of BBB manufacturing company. Therefore, the user of the advertisement providing apparatus sets ID of AAA manufacturer for the advertisement providing apparatus purchased by the AAA manufacturing company; and set ID of BBB company for the advertisement providing apparatus of BBB manufacturing company, whereby the memory card reproduction of another manufacturer can be prevented from.

Of course, the advertisement providing apparatus purchased by XYZ company being a distributing company can produce its own original software (advertisement data), whereas it is required that all of the software (advertisement data) brought by manufacturers (AAA or BBB manufacturing companies) can be reproduced. This can be accomplished by using ID data masking.

For example, in the present embodiment, ID consisting of customer ID and application type ID (by connecting three digits for application type with five digits for customer by hyphen (-)) is used. As the application type ID, 000 is assigned to manufacturer; and 001 to FFF (hexadecimal notation) is assigned to distributing company and rental company. Specifically, 001-12345 is assigned to XYZ1 distributing company; 002-12346 is assigned to XYZ2 distributing company; 003-12347 is assigned to R1 rental company; 004-12348 is assigned to R2 company; 000-12349 is assigned to AAA manufacturing company; and 000-12350 is assigned to BBB manufacturing company. In the case of lease, ID of company being a lease destination is assigned without assignment of the lease company ID. For example, if a commodity is leased to CCC manufacturing company via L1 lease company, 000-12351 that is ID of CCC manufacturing company is assigned; and if a commodity is leased to DDD manufacturing company via L2 lease company, 000-12352 that is ID of the DDD company is assigned. For demonstration, *-*** is assigned (all digits are masked).

FIG. 13 shows an example when the reproduction of each memory card can be performed for the ID of each apparatus. The apparatus IDs indicate apparatus purchased by XYZ1 distributing company; apparatus of XYZ2 distributing company; apparatus purchased by AAA manufacturing company; apparatus purchased by BBB manufacturing company; apparatus leased by BBB manufacturing company from R1 rental company; apparatus leased to CCC manufacturing company via L1 lease company; and demonstration apparatus, respectively. The software IDs indicate software of XYZ1 distributing company; software of BBB manufacturing company; software of CCC manufacturing company; software of DDD manufacturing company; and demonstration software.

As has been described above, in the case where ID data stored in an installed storage medium (such as memory card) differs from ID data assigned to each advertisement providing apparatus, information concerning advertisement called attribute data and advertisement information is disabled from being read from the storage medium, whereby provided services can be managed by each advertisement providing apparatus.

Now, a modified example of the aforementioned attribute data will be described below. The attribute data includes information such as memory capacity, manufacturing company (or selling company, service providing company or the like), or card type, and setting of advertisement schedule. For example, the following information is included.

Manufacturer: XX electric company
Capacity: 16 Mbytes
Medium type: Memory card
Customer name: YY confectionery
Customer code: 0012
Store name: ZZ branch office
Store code: 0005
Product name: Chocolate
Product code: 1024
Advertisement name: Metropolis only
Advertisement version and/or level: Ver. 1.05
Validity of advertisement: July, 2000

The validity of advertisement indicates the validity when advertisement information contained in a storage medium (such as memory card) may be displayed or provided. The aforementioned example shows that an advertisement display is permitted by the end of June, 2000. The validity of advertisement may be set by date and time. Alternatively a specific period may be indicated in a form of "from June 1, 2000 to July 31, 2000", for example.

Figure 14:
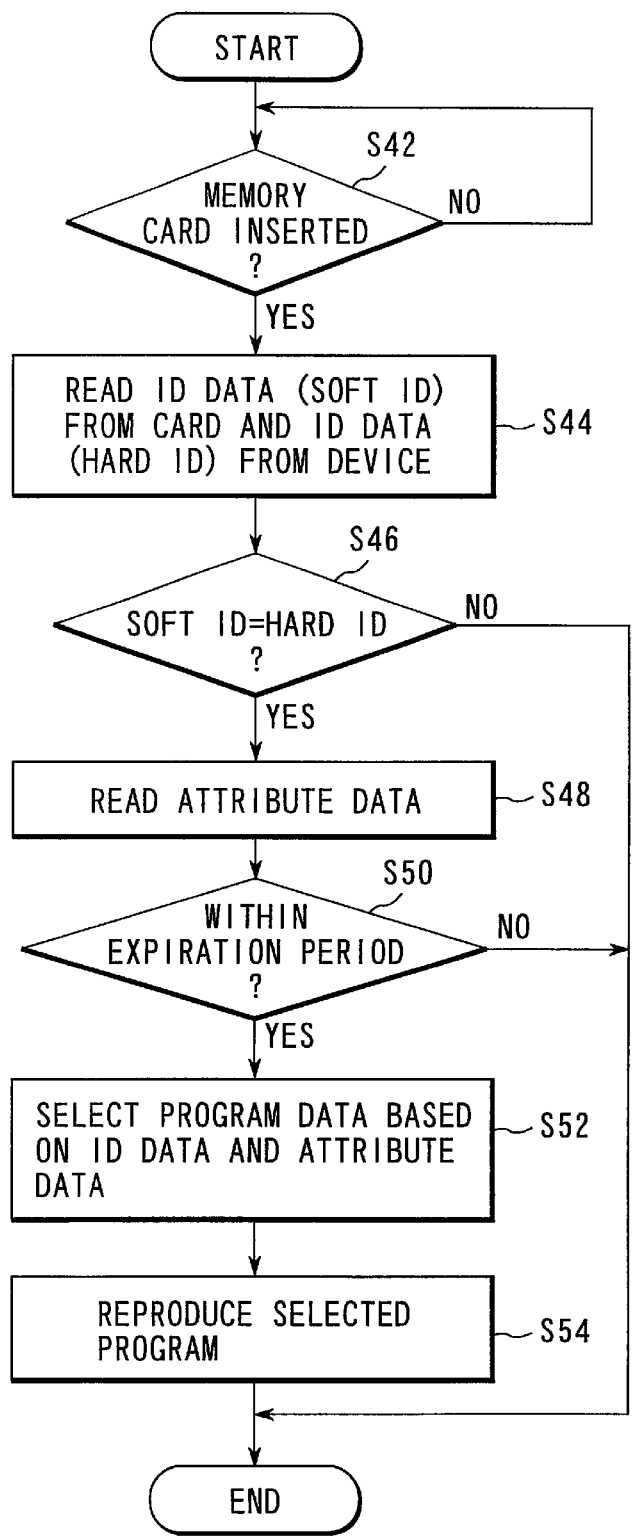
FIG. 14 is a flowchart showing still another operation of the first embodiment.

FIG. 14 is a flow chart showing an operation of the advertisement providing apparatus using attribute data containing such validity information. First, in step S42, the CPU 10 determines whether or not a storage medium such as memory card is mounted on a recording apparatus 20. If the storage medium is not mounted, the CPU waits until it has been mounted. When the mounting is detected, ID data (software ID) is read from the memory card in step S44, and ID data (hardware ID) is read from the ID memory 22 of the apparatus mainframe. In step S46, it is determined whether or not software ID coincides with hardware ID. If these IDs do not coincide with each other, it indicates that the memory card cannot be reproduced by the apparatus, and operation terminates. In the case where both of these IDs coincide with each other, attribute data is read from the memory card. In the present embodiment, data representing the validity of advertisement is stored as attribute data. In step S50, it is determined whether or not advertisement data is within the validity of advertisement. If the data is out of the validity of advertisement, operation terminates.

In the case where the data is within the validity of advertisement, a program according to ID data and attribute data is selected from among programs of #1 to #n stored in the advertisement data portion. In step S54, the selected program is reproduced.

As has been described above, according to the present embodiment, if the advertisement information stored in the mounted storage medium (such as memory card) is out of the validity of advertisement, such advertisement information is disabled from being displayed or presented from the storage medium (such as memory card). Thus, services can be provided within a predetermined period of time.

Figure 15:
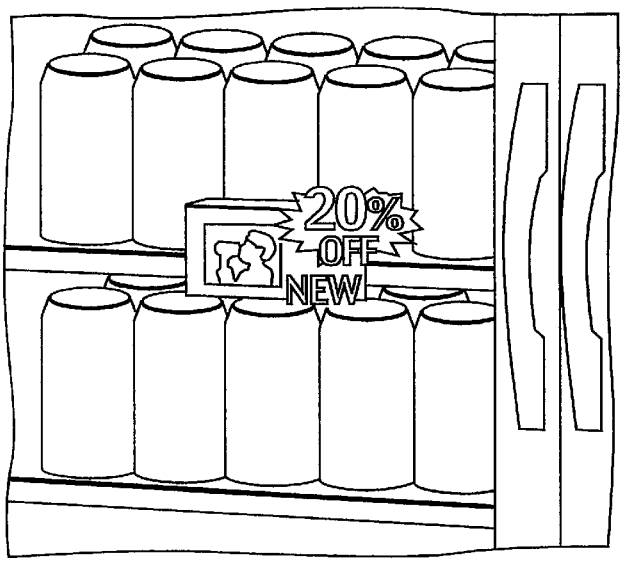
FIG. 15 shows a seventh use example of the first embodiment.

Although it is not shown as a modified example of the present embodiment in FIG. 6, a temperature sensor or a door open/close detecting sensor is provided to be disposed inside of a door of an reach-in cooler as shown in FIG. 15 to detect the opening of the door, whereby sound output may be started. The apparatus according to the present invention is continuously operable, and thus, is somewhat hot. Therefore, the apparatus is operable even under environment from −30° C. to 10° C., advertisement information demanded by the customer can be provided even at a site at which advertisement and promotion has been hardly done conventionally such as the inside of a freezer, refrigerator or reach-in cooler.

According to the present embodiment, advertisement providing operation is controlled and/or changed as required while external factors are grasped by a sensor, an effective advertisement can be provided to a customer, and electric power saving can be achieved. Further, although the conventional apparatus could not be used inside of a space-free freezer, refrigerator, or reach-in cooler or the like, there can be provided the advertisement providing apparatus installed in the refrigerator, freezer, or reach-in cooler, the apparatus being capable of advertisement and promotion useful for a customer since it is thin.

Figure 16:
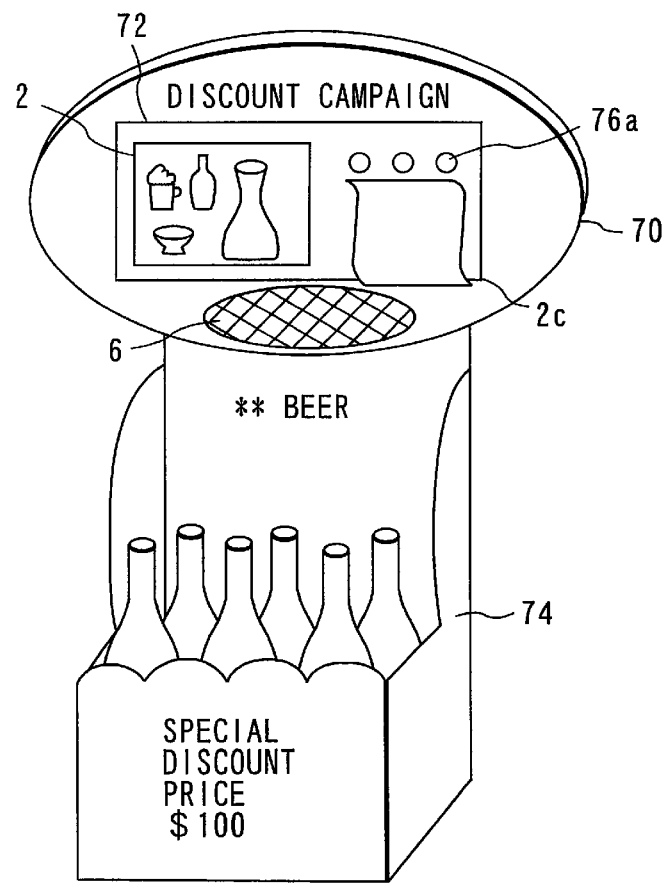
FIG. 16 shows an eighth use example of the first embodiment.

FIG. 16 shows still another example of the set up apparatus according to the present embodiment, and shows commodity exhibition fittings including the apparatus. The advertisement providing apparatus 72 is incorporated in the advertisement providing panel 70 of a commodity exhibiting fitting 74 that is integral with a commodity shelf having commodities stored therein. Reference numeral 76a denotes a button input device provided in the vicinity of the POP character 2C. Advertisement may be indicated on the surface of the advertisement providing apparatus 72 by using seals or stickers or the like.

In addition, although it is not shown, this commodity exhibition fitting 74 comprises power supply means for supplying power to the advertisement providing apparatus 72.

According to this setup example, the advertisement providing apparatus, commodity shelf or base, and POP advertisement are incorporated integrally, whereby comprehensive advertisement activities can be performed, which has been difficult conventionally. In addition, commodity appealing and audiovisual ratings of advertisement can be improved. Further, information and power supplies provided for the advertisement display apparatus can be provided, and a commodity exhibition fitting which is easily installed can be provided.

Figure 17:
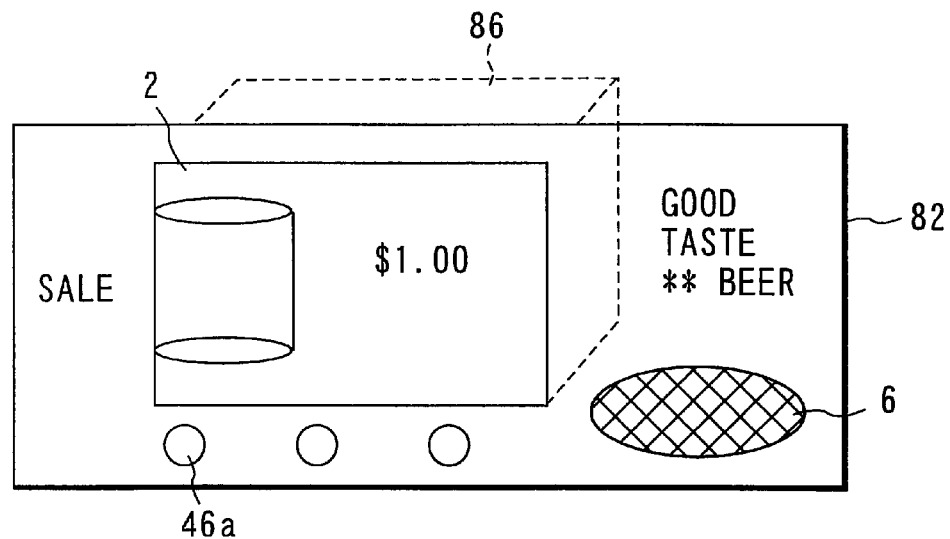
FIG. 17 shows a ninth use example of the first embodiment.
Figure 18:
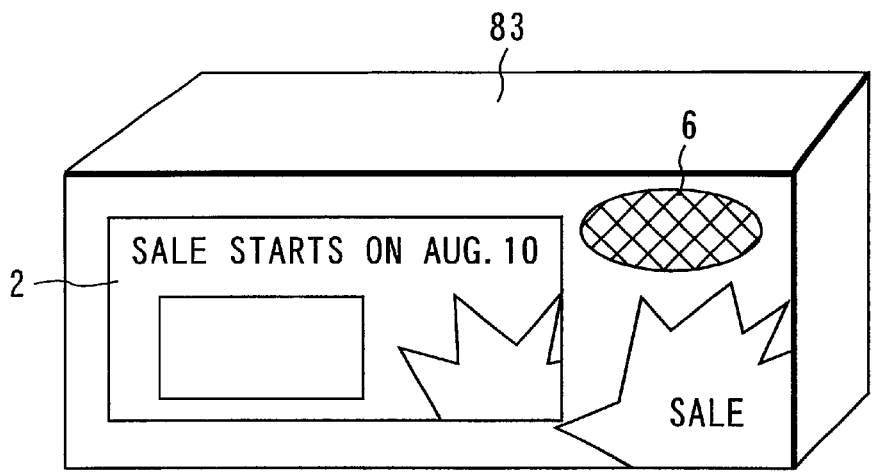
FIG. 18 shows a tenth use example of the first embodiment.

FIG. 17 and FIG. 18 each show the advertisement providing apparatus used compactly in combination with an advertisement display panel 82 or advertisement display case 83. According to this advertisement display panel 82 or advertisement display case 83, a high advertisement effect is achieved irrespective of small space. This panel or case is mounted by fittings such as adhesive tape or bolts, it can be easily removed arbitrarily.

In addition, there can be provided an advertisement display apparatus in which similar advertisement effect can be achieved by directly applying advertisement to the mainframe of the advertisement display apparatus without providing the advertisement display panel 82 or advertisement display case 83.

In the aforementioned description, although there is no remarkable explanation of the apparatus mainframe, the mainframe is preferably arranged to be transparent or semi-transparent. A transparent or semi-transparent plastic case is employed for the mainframe. This case can appeal the presence of commodities to be hidden behind the back of the mainframe, and can prevent reduction of an advertisement affect due to the advertisement providing apparatus, and can fully charge a customer for advertisement integrally with commodities. In addition, a transparent or semi-transparent color case may be employed for the mainframe so as to improve design properties.

Further, although it is not shown, electric decorating means may be provided as an outstanding decoration on the surface of the advertisement providing apparatus. The electric decorating means consists of an electric bulb, an electric discharge tube, a fluorescent tube, or a light emitting diode and the like, and is decorated so as to express the contour of the mainframe of the advertisement providing apparatus. In addition, this electric decorating means receives an instruction from the CPU 10 as required in order to cause interlocking with an image display apparatus or a sound output apparatus, and can turn on or blink a lamp. Therefore, providing a visual advertisement effect attracts a customer, and contributes to sales promotion.

As has been described above, according to the first embodiment, there can be provided the advertisement providing apparatus displaced near or at the commodity, the apparatus effectively providing to a customer an advertisement and promotion by combining moving images, still images, characters, graphics, and sound concerning the advertisement with each other. In addition, there can be provided a small sized advertisement providing apparatus in which, even if the apparatus is disposed at a commodity shelf or base and at a site at which large sized commodity is present, all of the commodities are not hidden behind the back of the apparatus, the apparatus providing to a customer an effective advertisement and promotion without losing appearance.

The apparatus can be installed on a regular commodity shelf with its limited space. By appealing distinguishing with competitive commodities, the apparatus is effective in a brand switch for a regular commodity. Showing a detailed description, an example of use, an example of application or the like makes it possible for a consumer to increase a wish to purchase a commodity which the consumer does not want to do so. The apparatus can be installed at every commodity shelf in shop or in a selling space, and thus, images or commercial songs popular in television can be broadcast for promotion of various commodities without hiding the commodities.

Power supplies can be turned on or off according to ambient environment such as time of luminescence. Thus, there can be provided the advertisement providing apparatus capable of more significant reduction that the conventional apparatus.

Power supplies can be turned on or the display content and output volume are changed by detecting human access, and thus, advertisement can be effectively provided.

Advertisement information according to the time, weather, customer is provided to be automatically changed. Thus, there can be provided the advertisement providing apparatus capable of providing effective advertisement and promotion to a customer and capable of more significant labor reduction than the conventional apparatus.

The customer's request or instruction can be input, a program required by the user is interactively provided, and advertisement information useful for individuals such as direct mail corresponding to the customer can be provided.

There can be provided the advertisement providing apparatus in which advertisement information, advertisement related information, price reduction tickets, money certificate or information on price reduction tickets is printed, whereby a customer can deepen understanding of commodity and the audiovisual ratings are increased, the apparatus contributing sales and promotion.

There can be provided the advertisement providing apparatus in which lottery or quiz is provided to a customer, and special service, price reduction ticket or money certificate is provided according to the lottery result or answer rate. Therefore, there can be provided the advertisement providing apparatus capable of contributing to sales and promotion with higher audiovisual ratings of customers, and making it possible to significantly distinguishing commodities or retail shops.

There can be provided the advertisement providing apparatus capable of automatically providing advertisement information or information about commodities to a customer smoothly without any problem, and avoid illegal using such information. By providing attribute data on advertisement information bothersome in management in addition to the advertisement information, there can be provided the advertisement providing apparatus capable of easily managing advertisement information.

In the case where the mounted storage medium (such as memory card) contains stored ID data in advance; and ID data assigned to each advertisement providing apparatus different from the ID data, such advertisement information is disabled from being displayed or presented from a storage medium (such as memory card). Thus, services can be provided within a predetermined period of time.

Now, other embodiments of the present invention will be described below. In the other embodiments shown below, elements corresponding to those shown in the first embodiment is denoted by like reference numerals, and a detailed description will be omitted.

Second Embodiment

In the first embodiment, there has been described that, in the case where a detachable memory card is used as a storage medium for the mainframe (as described above, in the first embodiment, such storage medium may not be always detachable, and further, in the case where the storage medium is detachable, a video tape is available without limited to such storage medium) or in the case where the content of an advertisement program is changed, the storage medium is removed, and the storage data is rewritten by another apparatus (memory reader/writer). Hereinafter, a second embodiment concerning rewriting of advertisement data in the case where the storage medium of the storage apparatus 20 is fixedly mounted to the mainframe will be described. In the second embodiment, a storage medium may be a chip-shaped semiconductor memory without being limited to a memory card, and may be a hard disk or the like without being limited to such semiconductor memory. That is, in the present embodiment, the apparatus mainframe is compatible with an advertisement data rewriting apparatus, and the data to be rewritten is externally supplied wirelessly or via wire.

Figure 19:
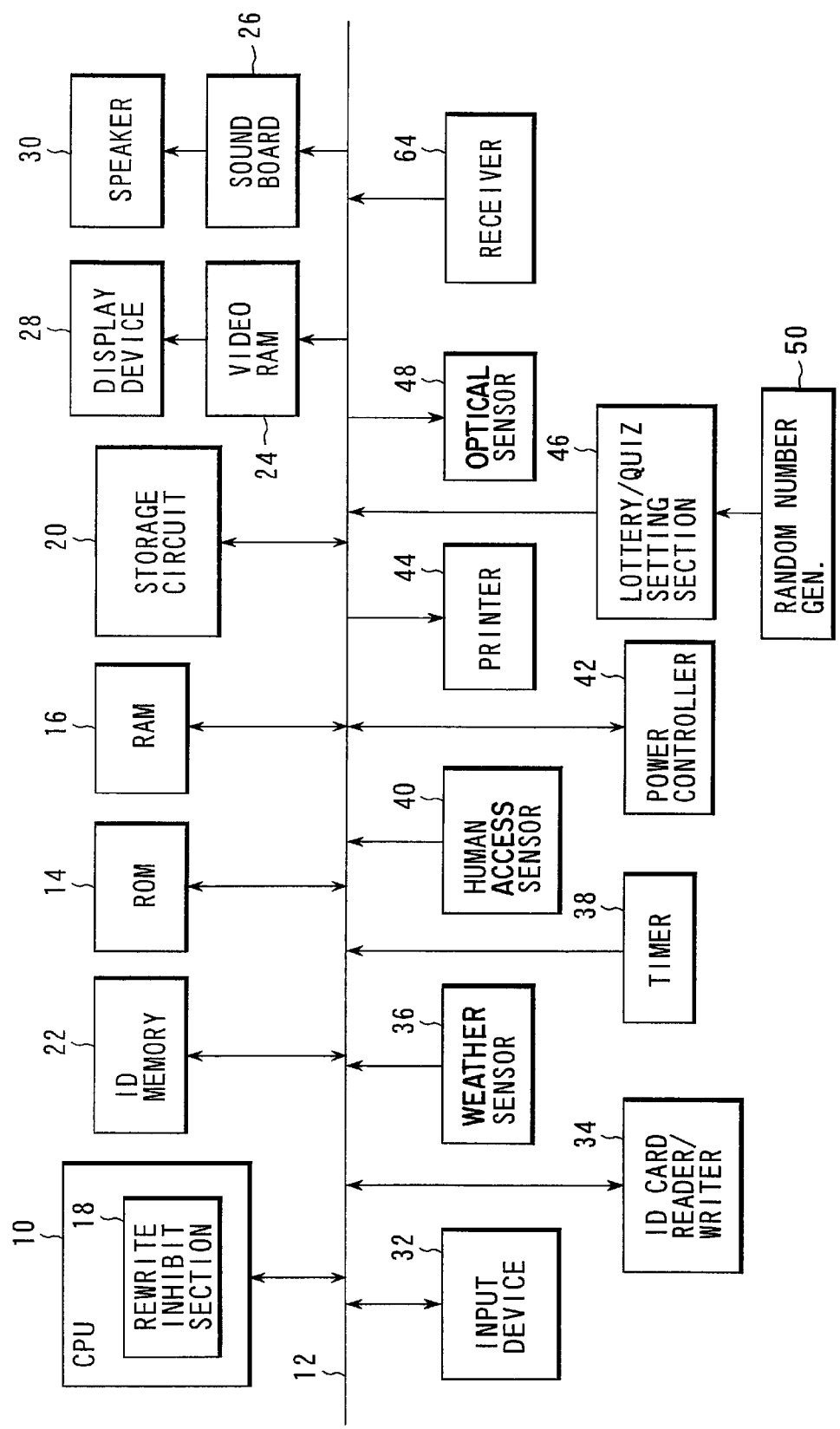
FIG. 19 shows a block diagram of an electronic POP apparatus as a second embodiment of a message providing apparatus according to the present invention.

FIG. 19 is a block diagram depicting a message providing apparatus according to the present embodiment. The illustrative embodiment is different from the first embodiment in that a receiver 64 for receiving rewritten data is added to the CPU bus 12. In the case where a data transmission medium is a radio signal such as TV ground wave, FM wave, communication satellite microwave, the receiver 64 requires an image/sound signal receiving antenna. Such antenna is mounted on the advertisement providing apparatus while it maintains insulation properties from each constituent element of the apparatus or is internally provided therein. In addition, in the case where rewritten data is supplied via a wired network such as optical fibers, the receiver 64 requires a modem or a terminal adapter. These modem and terminal adapter are mounted on the advertisement providing apparatus or internally provided therein.

Figure 20:
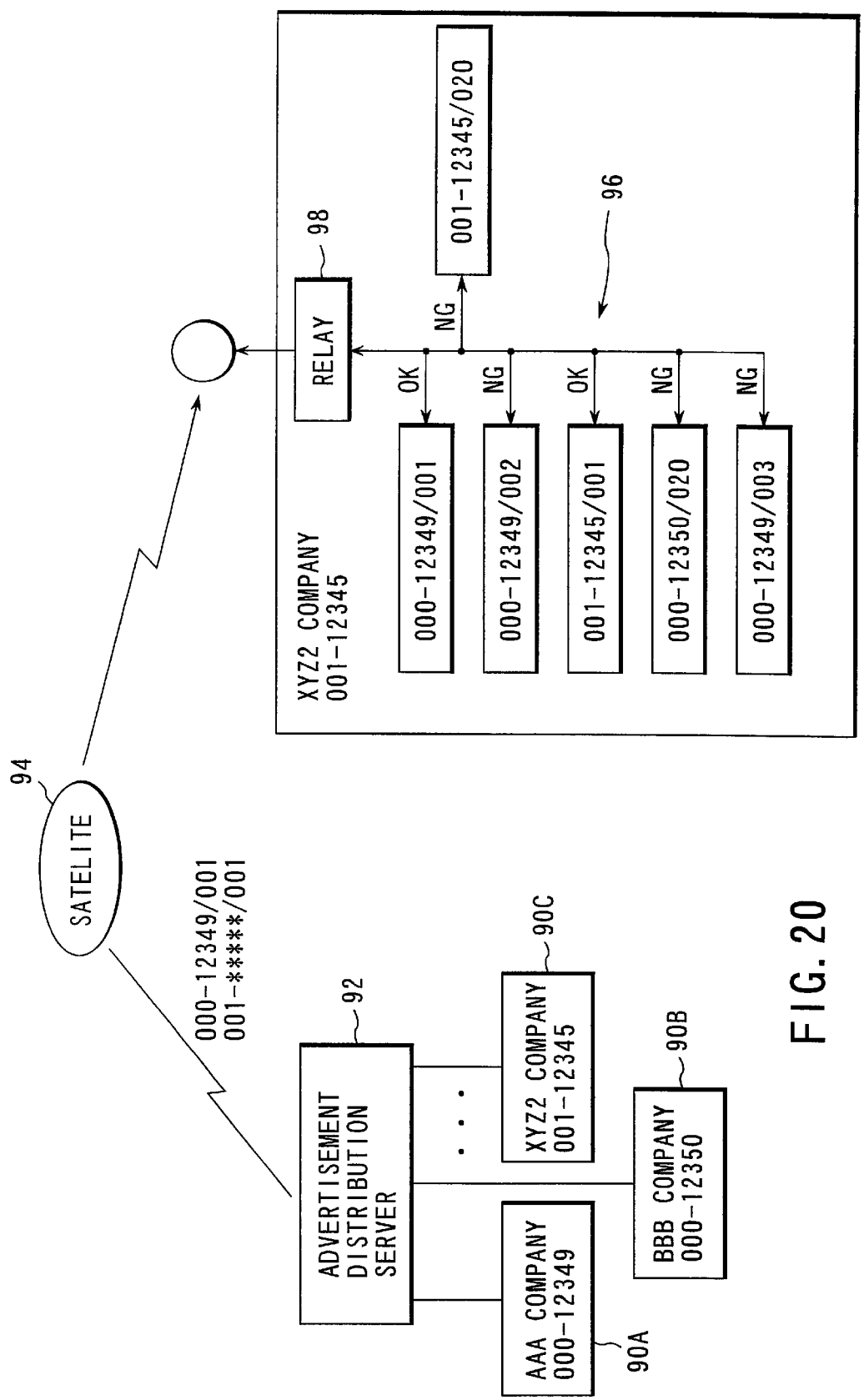
FIG. 20 shows an entire system of the second embodiment.

FIG. 20 is a view showing the entire system. Servers 90A, 90B, and 90C of each customer (AAA company, BBB company or the like) are connected to an advertisement distributing server 92. When the customer servers 90A, 90B, and 90C make a rewrite request, the advertisement distributing server 92 assigns an ID for specifying a target apparatus to rewrite data (real data shown in FIG. 7, and occasionally, attribute data), and broadcasts it via a satellite 94. A number of the advertisement providing apparatuses 96 (refer to FIG. 19 for arrangement) are installed at each retail shop, and these apparatuses are connected via LAN. The rewrite data broadcast from the satellite 94 is received by each store, and the received data is supplied to a LAN via a relay 98 to be distributed to all the apparatuses 96. In one retail shop, there are installed apparatuses 96 owned by various manufacturers/operation departments or apparatuses 96 owned by the retail shop and leased to the manufacturers/operation departments. For example, such apparatuses 96 include a apparatus (ID=000-12349/001) installed by toiletry operation department (ID=001) of AAA manufacturing company in stores of two XYZ retail companies; a apparatus (ID=000-12349/002) installed by the daily necessary operation department (ID=002) of AAA manufacturing company; a apparatus (ID=000-12349/003) installed by the food operation department (ID=003) of AAA manufacturing company; a apparatus (ID=000-12350/020) installed by the toiletry operation department (ID=020) of BBB manufacturing company; a apparatus (ID=001-12345/001) leased by XYZ2 retail company to the toiletry operation department (ID=001) of AAA manufacturing company; a apparatus (ID=001-12345/020) leased by XYZ2 retail company to the toiletry operation department of BBB manufacturing company or the like. When the toiletry operation department of AAA manufacturing company make a request an advertisement distributing server for rewriting advertisement data on all the apparatuses purchased by the company and the apparatus leased from all the stores of XYZ2 retail company, the distributing server 92 assigns the ID (001-x12349/001) of the apparatus purchased by the toiletry operation department of AAA manufacturing company and the ID (001-*****/001) of the apparatus leased from XYZ2 retail company to the advertisement data supplied from the toiletry operation department of AAA manufacturing company, and broadcasts it via a satellite. "*" denotes that the digits are masked.

Each apparatus receiving broadcasting data compares an ID attached to rewrite data with its own ID. When these IDs coincide with each other, it fetches reception data, and rewrites data stored in the storage apparatus 20 (the masked ID is regarded as being coincident). An example of comparing IDs is the same as that of comparing the ID of the memory card with the ID of the mainframe shown in FIG. 13. In addition, the described ID is merely provided as an example. Of course, the IDs shown in the first embodiment may be properly employed with each other according to a situation. This is because handling of seasonal commodities or sales commodities in a specific area differ depending on a shop location. Thus, in order to distribute software (data), it is required to manage individual shops. In addition, in the same kinds of shops, the nature of shops differs depending on its location, for example, whether or not the shop is located in front of station or along street, the items of commodities to be handled differs depending on its location. Thus, more detailed shop management is required. The data attribute is utilized as ID for distinguishing large sized moving image data such as commercial message, small sized character data to be superimposed thereon, and classification of commodity value, commodity code, commodity name, sales or the like. Data such as commercial message moving image is large in data size, and thus, is provided to be sent at a time other than operation time of shop. In addition, data such as character data to be superimposed, commodity price, commodity code, commodity name, sales or the like is relatively small in data size, and thus, can be repeatedly re-sent during operation time, thereby making it possible to facilitate arbitrary price change or the like. At a stage such as data broadcasting, image data such as commercial message of the same manufacturer can be utilized whatever it may be an apparatus brought by a manufacturer or an apparatus owned by a distributing company, and thus, the image data can be transmitted to a plurality of apparatus at the time of one data broadcast.

In data rewriting, not only real data is rewritten, but also attribute data such as validity may be rewritten. That is, it may be required to update validity with contract novation. In addition, the data may be partially rewritten, for example, by each layer such as still images, moving images, characters, graphics, sound or the like.

Further, a medium for distributing data from the advertisement distributing server 92 may be a PHS network, a hand-held telephone network, an infrared-ray LAN, a BS broadcasting network, a CS broadcasting network, a data broadcasting network such as VHS or UHS, or a wired network (such as LAN) without being limited to radio frequency waves. Although digital and analog data may be distributed, digital data is generally distributed.

In FIG. 20, although the relay 98 is employed, each apparatus may receive rewrite data directly from the satellite 94. In addition, the relay 98 may function as a personal computer having a data transmitter for a receiver and the advertisement providing apparatus incorporated in its dedicated set-top box or register.

Further, the advertisement distributing server 92 can send adjustment data such as advertisement providing volume, tone, brightness, color concentration, timer set data, various sensor set data as well as advertisement data.

Furthermore, the apparatus not only receives a signal from the advertisement distributing server 92, but also may have a function for transmitting the customer's instruction information input from the input device 32, the questionnaire result, or money certificate or coupon ticket issuance information to each of the customer's servers 90A, 90B, and 90C via the advertisement distributing server 92.

According to the present embodiment, in addition to an advantageous effect of the first embodiment, attribute data and/or advertisement data can be provided via communication line, and there can be provided the advertisement providing apparatus capable of providing the newest advertisement information to a customer. In addition, there is an advantage that data can be delivered and/or rewritten at a high speed.

Third Embodiment

The aforementioned advertisement providing apparatus is installed near commodities in shop, and provides information on these commodities interactively via a multimedia such as moving images, still images, graphics, characters or sound. This advertisement providing apparatus can provide more information than that obtained by actually seeing or touching commodities, and thus, the customer's wish to purchase commodities can be enhanced very significantly. However, in the case of large sized commodities such as bed or furniture, there is a problem that the customer cannot place an order on the spot. On the other hand, there is practically available online sales in which a variety of commodity information is provided to a customer online using a personal computer or a multimedia terminal, and the customer can order a commodity. This online sales has a problem that the customer cannot purchase any commodity by actually seeing or touching it. In addition, in order to find a desired one from among a variety of commodities, it is required to open a screen display consisting of a number of hierarchies, and a problem of poor usability occurs.

Figure 21:
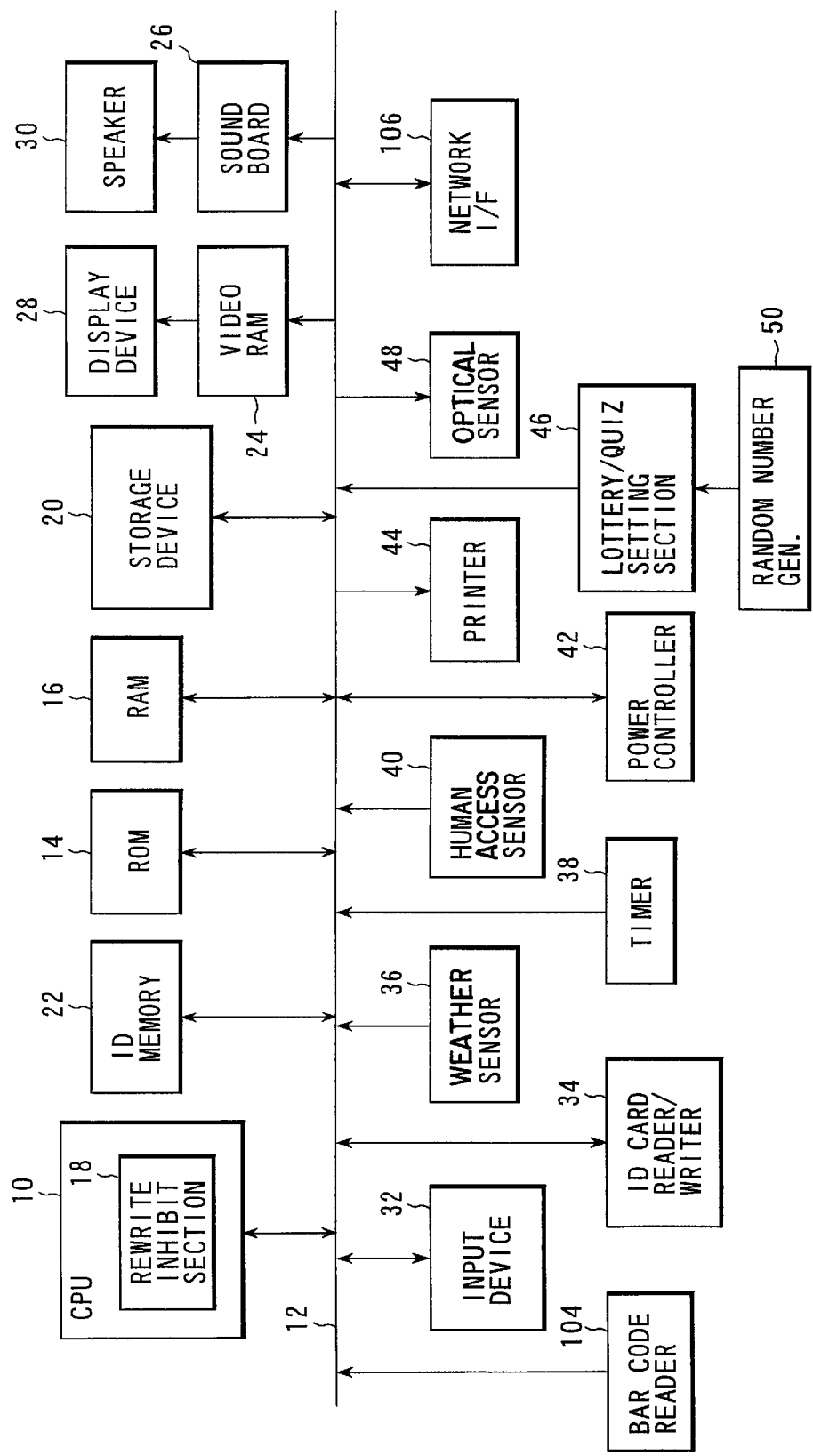
FIG. 21 shows a block diagram of an electronic POP apparatus as a third embodiment of a message providing apparatus according to the present invention.

Now, a third embodiment of the advertisement providing apparatus making it possible for a customer to place an order on the spot while actually seeing or touching a commodity or a commodity sample will be described below. FIG. 21 is a block diagram depicting an arrangement of the advertisement providing apparatus according to the third embodiment. The illustrative embodiment is different from the first embodiment in that a bar code reader 104 and a network connection apparatus 106 are added to the CPU bus 12.

The ID card reader/writer 34 is a apparatus for reading data recorded in the customer's ID card and writing data into the card. Examples of this card include a magnetic card, an IC card, a non-contact type card, an ID card, a prepaid card, a settlement banking card, a credit card or the like. In any case, an ID for identifying individual must be recorded.

The ID of the card read by the ID card reader/writer 34 is temporarily stored in the RAM 16, and is utilized for individual authentication. An example of how such individual authentication is done will be described later.

In addition, the ID card reader/writer 34 writes data on an ordered commodity as a receipt into the card. Examples of the data include commodity code, commodity name, quantity, manufacturing company, shop name, sales company, settlement method (cash, postal transfer, bank transfer, payment using credit card, payment by installment, payment in full or the like). The complimentary information to be described in a coupon ticket and the points of point service may be written together.

The ID card reader/writer 34 for non-contact type card comprises a non-contact type card and an antenna for transmitting and receiving data.

The bar code reader 104 is a apparatus for reading a bar code (indicating a commodity code) of a commodity. The bar code reader is employed when it is required to specify a commodity, for example, when a customer order a commodity or retrieves commodity information. The bar code read by the bar code reader 104 is temporarily stored in the RAM 16, and the commodity is identified by the CPU 10. The advertisement providing apparatus is disposed near a single kind of commodities or commodity samples. When only an order of that commodity is received, order placement using the advertisement providing apparatus itself denotes specifying the commodity, and thus, the bar code reader 104 may not be provided.

The input device 32 may be a touch panel type input device or may be a key input device having a keyboard. The input device 32 is employed when a commodity code of a target commodity is input, when the quantity of a target commodity is input, when commodity information is retrieved, or when answer to questionnaire is made. However, when the advertisement providing apparatus is disposed near a single kind of commodities or commodity samples, and only an order of that commodity is received, order placement using the advertisement providing apparatus itself denotes specifying an order of that commodity. Thus, any commodity code may not be input. The data input from the input device 32 is temporarily stored in the RAM 16.

The printer 44 is a apparatus for issuing a receipt of an order having data on an ordered commodity printed thereon, a coupon ticket, a point seal, and a point card. On the order receipt, for example, there are printed commodity code, commodity name, quantity, manufacturing company, shop name, sales company, settlement method (cash, postal transfer, bank transfer, payment using credit card, payment of installment, payment in full or the like).

The network connection apparatus 106 is a apparatus for connecting the advertisement providing apparatus to a network. Although it is not shown, a server is connected to a network, and the advertisement providing apparatus is a client. In this manner, for example, the newest commodity data can be received from a server connected to the network. In addition, for example, order data on a commodity received from a customer and data on questionnaire result can be transferred to a server connected to the network. Examples of order data on such commodity include the customer owned card ID, commodity code, commodity name, quantity, manufacturing company, shop name, sales company, settlement method (cash, postal transfer, bank transfer, payment using credit card, payment by installment, payment in full or the like). This network may be connected via wire or wirelessly. When a network is connected via wire, a network connecting apparatus 106 comprises an antenna.

Examples of order data of such commodity include the customer owned card ID, commodity code, commodity name, quantity, manufacturing company, shop name, sales company, settlement method (cash, postal transfer, bank transfer, payment using credit card, payment by installment, payment in full or the like).

Now, a flow of the customer's commodity order placement will be described with respect to a case in which each order is settled immediately after such each order has been received and a case in which all orders are settled after all of such orders have been received, using the advertisement providing apparatus of the present invention installed near commodities or commodity samples in shop.

Figure 22:
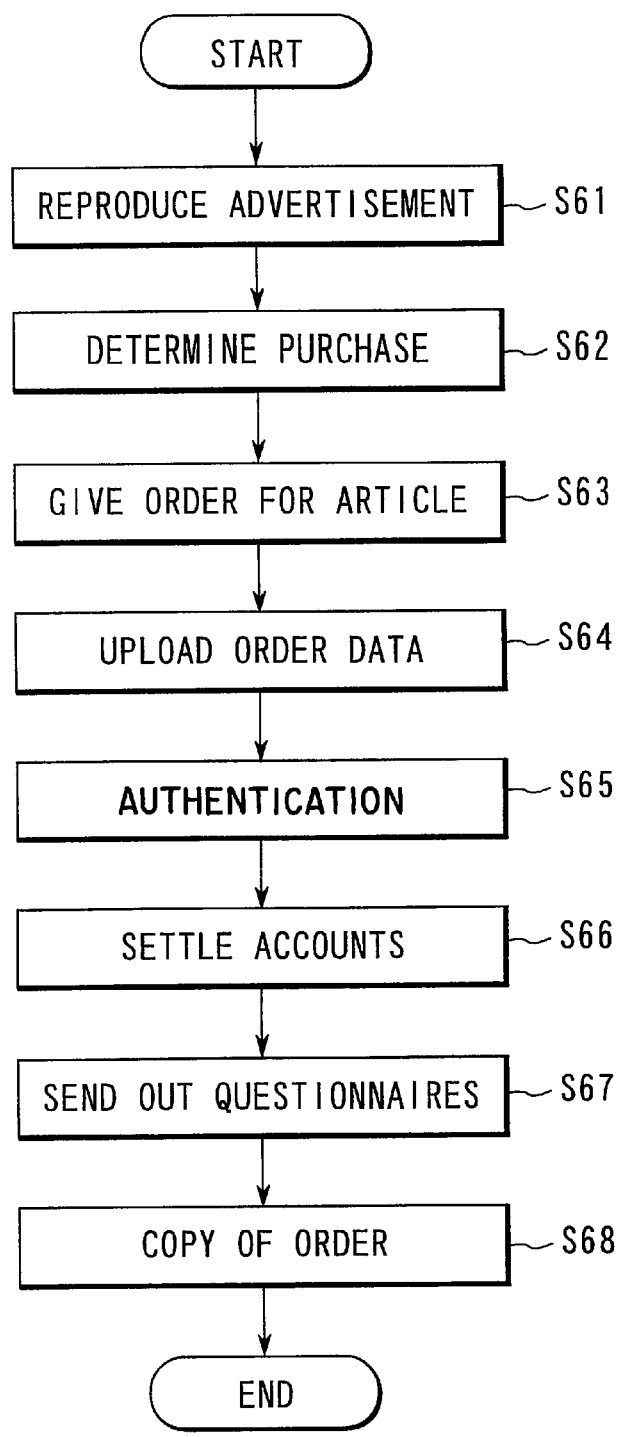
FIG. 22 is a flowchart showing an operation of the third embodiment.

First, a case in which an order is settled immediately after such order has been received will be described in accordance with a flowchart shown in FIG. 22.

In step S61, as described in the first embodiment, a commodity advertisement is supplied via a multimedia (moving images, still images, graphic, characters or sound).

In step S62, a customer determines whether or not he or she purchases a commodity by actually seeing or touching the commodity or commodity sample, and further, interactively acquiring detailed commodity information from the advertisement providing apparatus via multimedia.

In step S63, a customer orders a commodity. The ordering system differs depending on a case in which the advertisement providing apparatus is installed near a plurality of commodities or commodity samples or a case in which such advertisement providing apparatus is installed near a single commodity or commodity sample.

First, a case in which the advertisement providing apparatus is installed near a plurality of commodities or commodity samples will be described. In this case, a customer inputs a bar code attached to a target commodity to the advertisement providing apparatus by means of the bar code reader 104 or inputs a commodity code of a target commodity to the advertisement providing apparatus by means of the input device 32 (touch panel and keyboard are available), thereby specifying a target commodity. Further, the customer inputs the quantity of a target commodity to the advertisement providing apparatus by means of the input device 32.

Next, a case in which the advertisement providing apparatus is installed near a single kind of commodities or commodity samples. In this case, a customer does not need to specify a commodity, and inputs the commodity quantity to the advertisement providing apparatus by means of the input device 32. In order to make it unnecessary for the customer to specify a commodity, for example, commodity codes are stored in advance in the ROM 14, and the commodity quantity is input by means of a key input device, whereby a commodity having its commodity code may be ordered by the input quantity.

In step S64, the advertisement providing apparatus sends the order data on a commodity received from a customer to a server via a network. If the advertisement providing apparatus is not connected to a network, the order data on the commodity received from the customer is written in a detachable recording medium such as memory card or floppy disk, and is sent offline to a server via the recording medium. Examples of the order data of such commodity include the customer owned card ID, commodity code, commodity name, quantity, manufacturing company, shop name, and sales company.

In step S65, authentication is performed. To do this, the advertisement providing apparatus reads the customer owned card ID by means of the card reader 34, and authenticates the customer. Customer authentication may be performed by means of ID only or may be performed by utilizing the customer specific information such as password (hereinafter, referred to as "password"). In addition, such authentication may be performed by means of signature or the customer specific biological features (such as finger print, iris, retina, sound print or the like). In the case of using signature or the customer specific biological features, an input device for that purpose is connected to the advertisement providing apparatus. In the case where authentication is performed by means of ID only, the advertisement providing apparatus determines that a person having the card is true. In the case where authentication is performed by utilizing a password, the advertisement providing apparatus prompts a customer for password entry. When the customer inputs a password by means of the input device 32, the advertisement providing apparatus reads the password associated with ID from a server when the advertisement providing apparatus is connected to a network or from ROM 14 when the advertisement providing apparatus is not connected to the network; and compares it with the customer input password. When both of them coincide with each other, it denotes successful authentication, and the processing goes to step S66. On the other hand, if they do not coincide with each other, it denotes unsuccessful authentication, and the advertisement providing apparatus prompts a customer for password entry again. Alternatively, when authentication fails, although the advertisement providing apparatus prompts the customer for password entry again, the upper limit of allowable unsuccessful authentication count (for example, 3) may be provided. If authentication fails beyond the upper limit, an order received from the customer is cancelled, whereby card settlement may be disabled.

In step S66, settlement is performed. For example, in the case of a prepaid card, settlement is performed by transferring an amount of purchase from the card. In addition, in the case of a settlement bank card, for example, settlement is performed by transferring an amount of purchase from the customer's bank account. This transfer from the bank account is performed online via a server when the advertisement providing apparatus is connected to a network or offline via a recording medium when the apparatus is connected to the network. When settlement has been completed, the advertisement providing apparatus sends data on the completion of settlement to a server when the apparatus is connected to a network or writes the data into a recording medium when it is not connected to the network. However, in the case of a credit card, settlement is performed by specifying a payment method (revolving-payment, payment by installment, or payment in full). In this case, when the payment method has been specified, the advertisement providing apparatus sends data on the payment method when the apparatus is connected to a network or writes the data into a recording medium when it is not connected to the network.

In step S67, the advertisement providing apparatus executes questionnaire for a customer who has purchased a commodity. The data on such questionnaire result is sent from the advertisement providing apparatus to a server via a network when the advertisement providing apparatus is connected to a network. If the advertisement providing apparatus is not connected to the network, the data on questionnaire result is written into a recording medium.

In step S68, the advertisement providing apparatus writes the customer ordered commodity data to the customer owned card by means of a card reader. In addition, the data on the ordered commodity is printed by a printer, and the order receipt is issued. Examples of such commodity order data include commodity code, commodity name, quantity, manufacturing company, shop name, sales company, notification of the completion of settlement, or payment method. Further, the complimentary information to be described in a coupon ticket or points of the point service may be written together into the card. Together with the receipt, a coupon ticket, a point seal, or point card may be issued.

Figure 23:
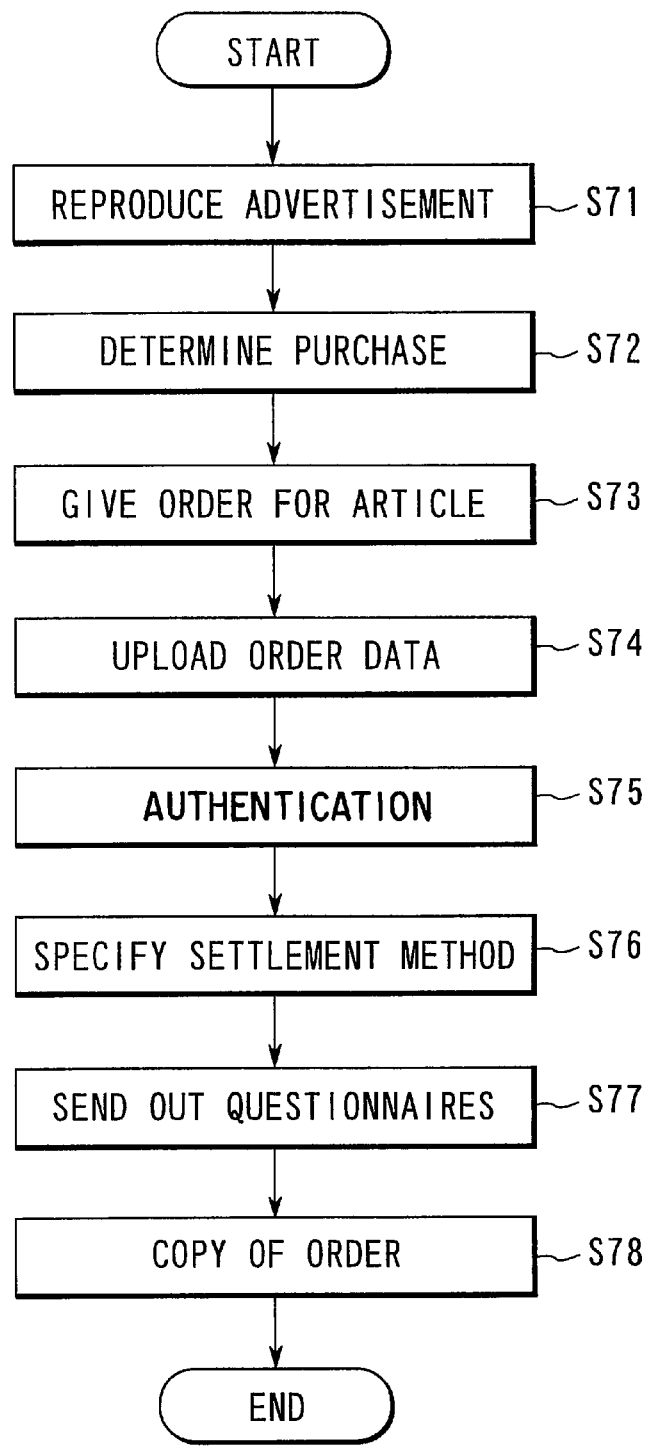
FIG. 23 is a flowchart showing another operation of the third embodiment.

Next, a case in which all orders are settled after order placement will be described in accordance with a flowchart shown in FIG. 23.

In step S71, as described in the first embodiment, a commodity advertisement is supplied via multimedia (moving images, still images, graphics, characters, sound, or the like).

In step S72, a customer determines whether or not he or she purchases a commodity by actually seeing or touching the commodity or commodity sample, and further, interactively acquiring detailed commodity information from the advertisement providing apparatus via multimedia.

In step S73, a customer orders a commodity. The ordering system differs depending on a case in which the advertisement providing apparatus is installed near a plurality of commodities or commodity samples or a case in which such advertisement providing apparatus is installed near a single commodity or commodity sample.

First, a case in which the advertisement providing apparatus is installed near a plurality of commodities or commodity samples will be described. In this case, a customer inputs a bar code attached to a target commodity to the advertisement providing apparatus by means of the bar code reader 104 or inputs a commodity code of a target commodity to the advertisement providing apparatus by means of the input device 32 (touch panel and keyboard are available), thereby specifying a target commodity. Further, the customer inputs the quantity of a target commodity to the advertisement providing apparatus by means of the input device 32.

Next, a case in which the advertisement providing apparatus is installed near a single kind of commodities or commodity samples. In this case, a customer does not need to specify a commodity, and inputs the commodity quantity to the advertisement providing apparatus by means of the input device 32. In order to make it unnecessary for the customer to specify a commodity, for example, commodity codes are stored in advance in the ROM 14, and the commodity quantity is input by means of a key input device, whereby a commodity having its commodity code may be ordered by the input quantity.

In step S74, the advertisement providing apparatus sends the order data on a commodity received from a customer to a server via a network. If the advertisement providing apparatus is not connected to a network, the order data on the commodity received from the customer is written in a detachable recording medium such as memory card or floppy disk, and is sent offline to a server via the recording medium. Examples of the order data of such commodity include the customer owned card ID, commodity code, commodity name, quantity, manufacturing company, shop name, and sales company.

In step S75, authentication is performed. To do this, the advertisement providing apparatus reads the customer owned card ID by means of the card reader 34, and authenticates the customer. Customer authentication may be performed by means of ID only or may be performed by utilizing the customer specific information such as password (hereinafter, referred to as "password"). In addition, such authentication may be performed by means of signature or the customer specific biological features (such as finger print, iris, retina, sound print or the like). In the case of using signature or the customer specific biological features, an input device for that purpose is connected to the advertisement providing apparatus. In the case where authentication is performed by means of ID only, the advertisement providing apparatus determines that a person having the card is true. In the case where authentication is performed by utilizing a password, the advertisement providing apparatus prompts a customer for password entry. When the customer inputs a password by means of the input device 32, the advertisement providing apparatus reads the password associated with ID from a server when the advertisement providing apparatus is connected to a network or from ROM 14 when the advertisement providing apparatus is not connected to the network; and compares it with the customer input password. When both of them coincide with each other, it denotes successful authentication, and the processing goes to step S66. On the other hand, if they do not coincide with each other, it denotes unsuccessful authentication, and the advertisement providing apparatus prompts a customer for password entry again. Alternatively, when authentication fails, although the advertisement providing apparatus prompts the customer for password entry again, the upper limit of allowable unsuccessful authentication count (for example, 3) may be provided. If authentication fails beyond the upper limit, an order received from the customer is cancelled, whereby card settlement may be disabled.

In step S76, a settlement (payment) method is specified. A customer specifies a settlement (payment) method by using the input device 32. Examples of this method includes postal transfer, bank transfer, and payment by cash made after the customer has confirmed the delivered commodity. When the settlement method has been specified, the advertisement providing apparatus sends data on the payment method to a server when the apparatus is connected to a network or writes the data into a recording medium when it is not connected to the network.

In step S77, the advertisement providing apparatus executes questionnaire for a customer who has purchased a commodity. The data on such questionnaire result is sent from the advertisement providing apparatus to a server via a network when the advertisement providing apparatus is connected to a network. If the advertisement providing apparatus is not connected to the network, the data on questionnaire result is written into a recording medium.

In step S78, the advertisement providing apparatus writes the customer ordered commodity data to the customer owned card by means of a card reader. In addition, the data on the ordered commodity is printed by a printer, and the order receipt is issued. Examples of such commodity order data include commodity code, commodity name, quantity, manufacturing company, shop name, sales company, notification of the completion of settlement, or payment method. Further, the complimentary information to be described in a coupon ticket or points of the point service may be written together into the card. Together with the receipt, a coupon ticket, a point seal, or point card may be issued.

An example of the flow of ordering a commodity using the advertisement providing apparatus has been described above. A server is placed in warehouse or the like where the order data on commodities received from the customers (customer owned card ID, commodity code, quantity or the like) and data on questionnaire result are collected. When the advertisement providing apparatus is not connected to a network, the order data on commodities received from the customers (customer owned card ID, commodity code, quantity or the like) and data on questionnaire result are collected by recollecting the recording media.

There are various methods of commodity delivery. For example, they includes pickup in shop or delivery to the customer's home. Therefore, a method of delivering an ordered commodity may be specified from the advertisement providing apparatus.

Figure 24:
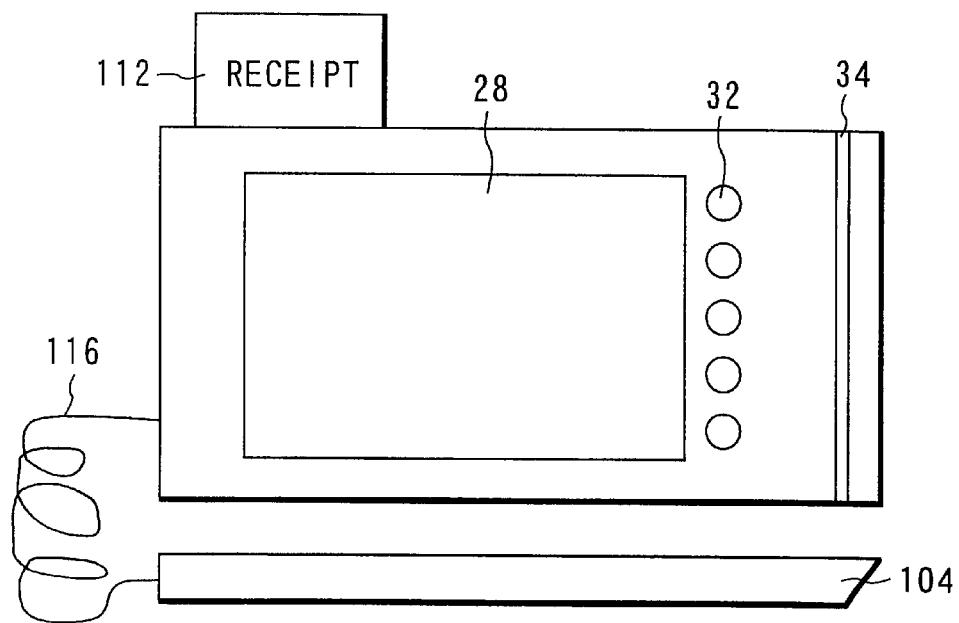
FIG. 24 is a schematic diagram showing one example of the third embodiment.
Figure 25:
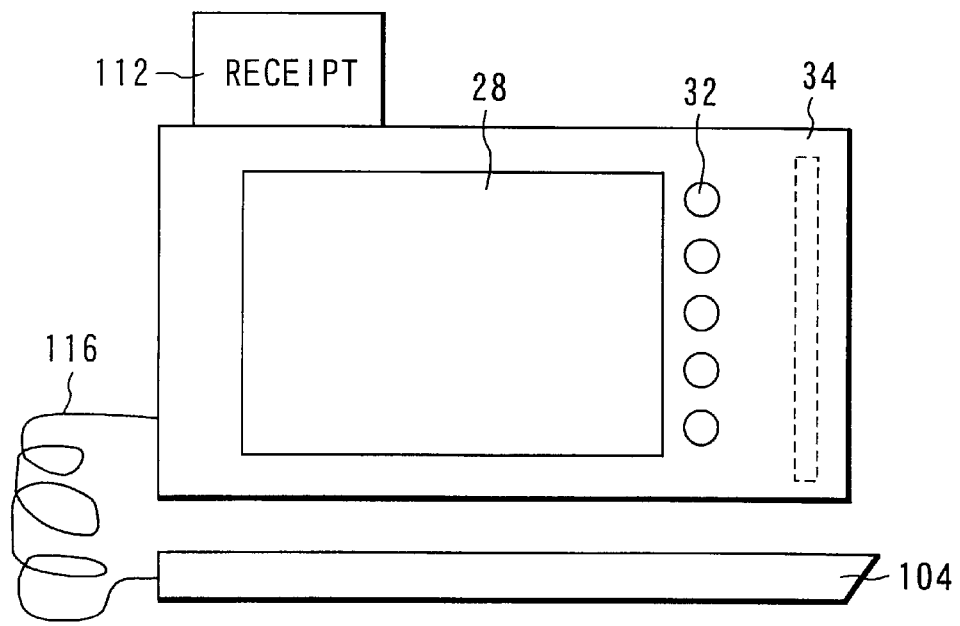
FIG. 25 is a schematic diagram showing another example of the third embodiment.

The advertisement providing apparatus according to the present invention may be shaped arbitrarily in consideration of an installation place or an advertisement effect. In general, some units configuring the advertisement providing apparatus are incorporated in the mainframe, and the other units are provided as accessories. However, it is arbitrary as to what units are incorporated in the mainframe or what units are provided as accessories. FIG. 24 and FIG. 25 are frontal views showing an example of the advertisement providing apparatus having only the bar code reader 104 provided as accessories and all the other constituent elements incorporated in the mainframe. A receipt 112 is printed from the printer 44. In addition, the bar code reader 104 is connected to the advertisement providing apparatus mainframe via a connection cable 116. The input device 32 consists of buttons. FIG. 24 shows an example using a contact type ID card reader/writer 34, wherein a card slot is exposed to the surface of the mainframe. FIG. 25 shows an example using a non-contact type ID card reader/writer 34, wherein the card reader/writer 34 is installed inside of the cabinet of the advertisement providing apparatus mainframe, and is expressed by broken line because the reader/writer cannot seen from the outside.

As has been described above, according to the present embodiment, commodity information can be interactively provided to a customer in via multimedia. In addition, the customer can place an order while he or she actually sees and touches a commodity or a commodity sample, and questionnaire can be collected. In a retail shop in which there is adopted a selling system in which their commodities or commodity samples of furniture or large-scaled home electronic commodities are placed in shop, information on commodities not placed therein is provided by commodity catalogues, and the ordered commodity is delivered from the warehouse to the customer's home, the present invention contributes to enhancement of the customer's wishes to purchase commodities, reduction of the clerk's burden, and space reduction in shop.

Secondly, the questionnaire result is transferred to a server via a network or written into an easily detachable recording medium such as floppy disk or memory card. Even if a plurality of shops are present or even if the questionnaire is performed in any shop, the result can be easily collected.

The present invention is not limited to the aforementioned embodiments, and various modification can occur without departing from the spirit of the present invention. For example, although each of these embodiments has been described independently, a plurality of embodiments may be combined as required. A setup example of the first embodiment shown in FIG. 2 to FIG. 5, FIG. 8 to FIG. 10, and FIG. 15 to FIG. 18 is applicable to the second and third embodiments similarly. In addition, modified examples of the first embodiment are all applicable to the second and third embodiments. The above embodiments are assumed to be powered by a commercial power source. However, it is possible to include a battery pack and supply power to the apparatus from the battery pack. Thus, a portable apparatus is realized such that it is possible to locate the apparatus at any place. The battery pack is not limited to the electric cell but may be a secondary cell. It is possible to provide a solar cell and charge the secondary cell from the solar cell.

According to the present invention, there are provided following apparatuses.

(1) A message providing apparatus in which a semiconductor memory storing message data containing at least one of a still image, moving image, character, graphic and sound is mounted, the message providing apparatus comprising sound output means for reproducing sound read from the semiconductor memory; and display means for displaying images, character or graphic read from the semiconductor memory.

(2) The apparatus according to (1), wherein the semiconductor memory stores a still image, moving image, character, graphic or sound, respectively, as layer data, and the display means displays a plurality of layer data to be superimposed.

(3) The apparatus according to (1), wherein the semiconductor memory is arranged as a card detachable from a mainframe of the apparatus.

(4) The apparatus according to (1), wherein the display means is a flat display.

(5) The apparatus according to (1), wherein the apparatus is housed in a transparent or semitransparent cabinet.

(6) The apparatus according to (1), wherein the apparatus is housed in an electrically decorated cabinet.

(7) The apparatus according to (1), wherein the message data is advertisement data and further comprising a printer for printing advertisement data, advertisement related information, price reduction ticket, money certificate, lottery ticket, or coupon ticket.

(8) The apparatus according to (1), further comprising means for providing lottery or quiz.

(9) A commodity display tool comprising a cabinet portion having a commodity housed therein; and a message providing apparatus according to one of (1) to (8) which is disposed integrally at the cabinet portion.

(10) An advertisement display apparatus comprising an advertisement display panel; and a message providing apparatus according to one of (1) to (8) which is disposed integrally in the panel.

(11) An advertisement display apparatus comprising an advertisement display box; and a message providing apparatus according to one of (1) to (8) which is disposed integrally in the box.

(12) The apparatus according to (1), wherein the message data is advertisement data and further comprising means for receiving an order from a customer.

(13) The apparatus according to (12), wherein the order receiving means comprises means for, when an order is received, authenticating a customer; means for, only when authentication is successful, sending order data to a server; and means for performing a settlement or specifying a settlement method if a settlement is to be performed later.

(14) A message providing apparatus comprising means for storing message data containing at least one of a still image, moving image, character, graphic and sound; sound output means for reproducing sound read from the semiconductor memory; display means for displaying images, character or graphic read from the semiconductor memory; and power control means for controlling power on/off of the apparatus.

(15) The apparatus according to (14), wherein the power control means comprises means for presetting a time schedule for turning on/off the power and means for, when a set time comes, turning on/off the power.

(16) The apparatus according to (14), wherein the power control means comprises means for detecting ambient brightness and means for turning on the power when the brightness is equal to or more than a first brightness, and turning off the power when the brightness is equal to or less than a second brightness which is equal to or less than the first brightness.

(17) The apparatus according to (14), wherein the semiconductor memory stores a still image, moving image, character, graphic or sound, respectively, as layer data, and the display means displays a plurality of layer data to be superimposed.

(18) The apparatus according to (14), wherein the semiconductor memory is arranged as a card detachable from a mainframe of the apparatus.

(19) The apparatus according to (14), wherein the display means is a flat display.

(20) The apparatus according to (14), wherein the apparatus is housed in a transparent or semitransparent cabinet.

(21) The apparatus according to (14), wherein the apparatus is housed in an electrically decorated cabinet.

(22) The apparatus according to (14), wherein the message data is advertisement data and further comprising a printer for printing advertisement data, advertisement related information, price reduction ticket, money certificate, lottery ticket, or coupon ticket.

(23) The apparatus according to (14), further comprising means for providing lottery or quiz.

(24) A commodity display tool comprising a cabinet portion having a commodity housed therein; and a message providing apparatus according to one of (14) to (23) which is disposed integrally at the cabinet portion.

(25) An advertisement display apparatus comprising an advertisement display panel; and a message providing apparatus according to one of (14) to (23) which is disposed integrally in the panel.

(26) An advertisement display apparatus comprising an advertisement display box; and a message providing apparatus according to one of (14) to (23) which is disposed integrally in the box.

(27) The apparatus according to (14), wherein the message data is advertisement data and further comprising means for receiving an order from a customer.

(28) The apparatus according to (27), wherein the order receiving means comprises means for, when an order is received, authenticating a customer; means for, only when authentication is successful, sending order data to a server; and means for performing a settlement or specifying a settlement method if a settlement is to be performed later.

(29) A message providing apparatus comprising means for storing message data containing at least one of a still image, moving image, character, graphic and sound; sound output means for reproducing sound read from the semiconductor memory; display means for displaying images, character or graphic read from the semiconductor memory; power control means for controlling power on/off of the apparatus; and control means for controlling an output volume of the sound output means or on/off of the display means.

(30) The apparatus according to (29), wherein the control means comprises means for detecting human access/departure and means for increasing an output volume of the sound output means when human access is detected, and decreasing the volume when human departing is detected.

(31) The apparatus according to (30), wherein the message data is advertisement data, the volume increasing/decreasing means increases the volume when a customer access is detected, and decrease the volume when a customer departure is detected.

(32) The apparatus according to (29), wherein the control means comprises means for detecting human access/departure and means for turning on the display means when human access is detected, and turning off the display means when human departure is detected.

(33) The apparatus according to (30), wherein the message data is advertisement data, the human access/departure detecting means detects a customer by distinguishing the customer from any other person, and the display on/off means turns on the display means when the customer access is detected, and turns off the display means when the customer departure is detected.

(34) The apparatus according to (19), wherein the semiconductor memory stores a still image, moving image, character, graphic or sound, respectively, as layer data, and the display means displays a plurality of layer data to be superimposed.

(35) The apparatus according to (29), wherein the semiconductor memory is arranged as a card detachable from a mainframe of the apparatus.

(36) The apparatus according to (29), wherein the display means is a flat display.

(37) The apparatus according to (29), wherein the apparatus is housed in a transparent or semitransparent cabinet.

(38) The apparatus according to (29), wherein the apparatus is housed in an electrically decorated cabinet.

(39) The apparatus according to (29), wherein the message data is advertisement data and further comprising a printer for printing advertisement data, advertisement related information, price reduction ticket, money certificate, lottery ticket, or coupon ticket.

(40) The apparatus according to (29), further comprising means for providing lottery or quiz.

(41) A commodity display tool comprising a cabinet portion having a commodity housed therein; and a message providing apparatus according to one of (29) to (40) which is disposed integrally at the cabinet portion.

(42) An advertisement display apparatus comprising an advertisement display panel; and a message providing apparatus according to one of (29) to (40) which is disposed integrally in the panel.

(43) An advertisement display apparatus comprising an advertisement display box; and a message providing apparatus according to one of (29) to (40) which is disposed integrally in the box.

(44) The apparatus according to (29), wherein the message data is advertisement data and further comprising means for receiving an order from a customer.

(45) The apparatus according to (44), wherein the order receiving means comprises means for, when an order is received, authenticating a customer; means for, only when authentication is successful, sending order data to a server; and means for performing a settlement or specifying a settlement method if a settlement is to be performed later.

(46) A message providing apparatus comprising means for storing plural message data containing at least one of a still image, moving image, character, graphic and sound; means for selecting one of the plural message data stored in the storing means; sound output means for reading a selected message data from the semiconductor memory and reproducing sound read included in the selected message; and display means for reading the selected message data from the semiconductor memory and displaying images, character or graphic included in the selected message.

(47) The apparatus according to (46), wherein the selecting means selects message data according to a time of day.

(48) The apparatus according to (46), wherein the selecting means comprises a sensor for acquiring weather and selects message data according to the weather.

(49) The apparatus according to (46), wherein the selecting means comprises input means for a user to input an instruction and selects message data according to the instruction from the input means.

(50) The apparatus according to (46), wherein the message data is advertisement data and the selecting means comprises a sensor for detecting customer data contained in a customer's card owned by a customer and selects message data according to the customer data.

(51) The apparatus according to (46), wherein the semiconductor memory stores a still image, moving image, character, graphic or sound, respectively, as layer data, and the display means displays a plurality of layer data to be superimposed.

(52) The apparatus according to (46), wherein the semiconductor memory is arranged as a card detachable from a mainframe of the apparatus.

(53) The apparatus according to (46), wherein the display means is a flat display.

(54) The apparatus according to (46), wherein the apparatus is housed in a transparent or semitransparent cabinet.

(55) The apparatus according to (46), wherein the apparatus is housed in an electrically decorated cabinet.

(56) The apparatus according to (46), wherein the message data is advertisement data and further comprising a printer for printing advertisement data, advertisement related information, price reduction ticket, money certificate, lottery ticket, or coupon ticket.

(57) The apparatus according to (46), further comprising means for providing lottery or quiz.

(58) A commodity display tool comprising a cabinet portion having a commodity housed therein; and a message providing apparatus according to one of (46) to (57) which is disposed integrally at the cabinet portion.

(59) An advertisement display apparatus comprising an advertisement display panel; and a message providing apparatus according to one of (46) to (57) which is disposed integrally in the panel.

(60) An advertisement display apparatus comprising an advertisement display box; and a message providing apparatus according to one of (46) to (57) which is disposed integrally in the box.

(61) The apparatus according to (46), wherein the message data is advertisement data and further comprising means for receiving an order from a customer.

(62) The apparatus according to (61), wherein the order receiving means comprises means for, when an order is received, authenticating a customer; means for, only when authentication is successful, sending order data to a server; and means for performing a settlement or specifying a settlement method if a settlement is to be performed later.

(63) A message providing apparatus in which a storing medium storing identification data thereof, message data containing at least one of a still image, moving image, character, graphic and sound and attribute data of the message data is mounted, the message providing apparatus comprising means for reading the identification data and the attribute data from the storing medium and selecting one of the plural message data stored in the storing medium based on the identification data and the attribute data; sound output means for reading a selected message data from the storing medium and reproducing sound read included in the selected message; and display means for reading the selected message data from the storing medium and displaying images, character or graphic included in the selected message.

(64) The apparatus according to (63), further comprising means for disabling rewriting of data in storage areas for the identification data and the attribute data of the storage medium.

(65) The apparatus according to (63), wherein the attribute data includes data indicating message data validity, and the selecting means includes means for disabling reproduction of message data whose validity has expired.

(66) The apparatus according to (63), further comprising an identification data memory for storing the identification data read from a storage medium; collating means for reading the identification data from the storage medium and the identification data memory and comparing the read identification data; and means for, if the comparison result of the collating means is not coincident, disabling reproduction of the mounted storage medium.

(67) The apparatus according to (66), wherein mask data invalidating identification setting is added to the identification data, and if the mask data invalidates identification setting, the collating means determines such invalidation as being coincident.

(68) The apparatus according to (63), wherein the semiconductor memory stores a still image, moving image, character, graphic or sound, respectively, as layer data, and the display means displays a plurality of layer data to be superimposed.

(69) The apparatus according to (63), wherein the semiconductor memory is arranged as a card detachable from a mainframe of the apparatus.

(70) The apparatus according to (63), wherein the display means is a flat display.

(71) The apparatus according to (63), wherein the apparatus is housed in a transparent or semitransparent cabinet.

(72) The apparatus according to (63), wherein the apparatus is housed in an electrically decorated cabinet.

(73) The apparatus according to (63), wherein the message data is advertisement data and further comprising a printer for printing advertisement data, advertisement related information, price reduction ticket, money certificate, lottery ticket, or coupon ticket.

(74) The apparatus according to (63), further comprising means for providing lottery or quiz.

(75) A commodity display tool comprising a cabinet portion having a commodity housed therein; and a message providing apparatus according to one of (63) to (74) which is disposed integrally at the cabinet portion.

(76) An advertisement display apparatus comprising an advertisement display panel; and a message providing apparatus according to one of (63) to (74) which is disposed integrally in the panel.

(77) An advertisement display apparatus comprising an advertisement display box; and a message providing apparatus according to one of (63) to (74) which is disposed integrally in the box.

(78) The apparatus according to (63), wherein the message data is advertisement data and further comprising means for receiving an order from a customer.

(79) The apparatus according to (12), wherein the order receiving means comprises means for, when an order is received, authenticating a customer; means for, only when authentication is successful, sending order data to a server; and means for performing a settlement or specifying a settlement method if a settlement is to be performed later.

(80) A message providing apparatus comprising means for storing message data containing at least one of a still image, moving image, character, graphic and sound; sound output means for reproducing sound read from the storing means; display means for displaying images, character or graphic read from the storing means; means for storing an identification data for identifying the apparatus; a receiving portion for receiving rewrite data of the message data; and means for judging weather or not the rewrite data is data to be destined to an own apparatus, and if the data is destined to the own apparatus, rewriting the message data stored in the storage means.

(81) The apparatus according to (80), wherein mask data partially invalidating identification data setting is added to the identification data, and if the mask data invalidates the identification data setting, the rewrite means assumes the rewrite data as data destined to the own apparatus with regard to a portion of the identification data.

(82) The apparatus according to (80), wherein the semiconductor memory stores a still image, moving image, character, graphic or sound, respectively, as layer data, and the display means displays a plurality of layer data to be superimposed.

(83) The apparatus according to (80), wherein the semiconductor memory is arranged as a card detachable from a mainframe of the apparatus.

(84) The apparatus according to (80), wherein the display means is a flat display.

(85) The apparatus according to (80), wherein the apparatus is housed in a transparent or semitransparent cabinet.

(86) The apparatus according to (80), wherein the apparatus is housed in an electrically decorated cabinet.

(87) The apparatus according to (80), wherein the message data is advertisement data and further comprising a printer for printing advertisement data, advertisement related information, price reduction ticket, money certificate, lottery ticket, or coupon ticket.

(88) The apparatus according to (80), further comprising means for providing lottery or quiz.

(89) A commodity display tool comprising a cabinet portion having a commodity housed therein; and a message providing apparatus according to one of (80) to (88) which is disposed integrally at the cabinet portion.

(90) An advertisement display apparatus comprising an advertisement display panel; and a message providing apparatus according to one of (80) to (88) which is disposed integrally in the panel.

(91) An advertisement display apparatus comprising an advertisement display box; and a message providing apparatus according to one of (80) to (88) which is disposed integrally in the box.

(92) The apparatus according to (80), wherein the message data is advertisement data and further comprising means for receiving an order from a customer.

(93) The apparatus according to (92), wherein the order receiving means comprises means for, when an order is received, authenticating a customer; means for, only when authentication is successful, sending order data to a server; and means for performing a settlement or specifying a settlement method if a settlement is to be performed later.

As has been described above, according to one aspect of the present invention, a semiconductor memory is incorporated, thereby making it possible to integrate a reproducing device with a display device.

Further, an external reproducing device is eliminated, the duration time of the reproducing section is unlimited, operation is simple, and a medium is free of being degraded. Thus, there is provided an advantage that an image is free of being degraded, a running cost is reduced, and data can be created and delivered at a high speed.

Unique media can be provided using a small sized display such as a liquid crystal display (LCD), and thus, image or sound information such as television commercial which is popular among consumers can be distributed immediately at the side of commodities displayed in shop. This makes it possible to demonstrate a description of handling, an example of use, an example of cook or the like via original image, which has been hardly communicated through the existing sales promotion tools, media such as paper, or shorttime television commercial message. Using a touch panel can start or switch an image, and enables direct appeal. The apparatus of compact size fits every commodity shelf or space placed in every place in shop from refrigerator to regular commodity shelf, and enables campaign of a variety of commodities together with television commercial message.

When the apparatus incorporates a power on play function for starting reproduction just by turning on the power source and an auto replay function for always reproducing image and sound repeatedly without operation, various operations and maintenance are eliminated, and there is no burden on shop.

A semiconductor memory stores advertisement information as digital data, whereby clear image and sound can be repeatedly reproduced without any interval. Even during extended use, image is free of being degraded, and there is no need for software replacement.

A high eye-catch effect is achieved because of image and sound appealing. The apparatus can be installed on a regular commodity shelf with its limited space. By appealing distinguishing with competitive commodities, the apparatus is effective in a brand switch for a regular commodity.

Showing a detailed description, an example of use, an example of application or the like makes it possible for a consumer to increase a wish to purchase a commodity which the consumer does not want to do so.

The apparatus can be installed at every commodity shelf in shop or in a selling space, and thus, images or commercial songs popular in television can be broadcast for promotion of various commodities without hiding the commodities.

Product image association or fixing in a selling space can be promoted together with television commercial message.

The recognition of commodity is improved by distributing image and sound or through television commercial message supply.

A effect of prevention of failure to purchase and a reminding effect is provided to a consumer.

The apparatus is compact, and has a high appealing effect. The apparatus is maintenance-free, and is easily acceptable in shop.

What is claimed is:

1. A message providing apparatus to which a nonvolatile semiconductor memory device which stores message data containing at least one of a still image, moving image, character, graphic and sound is able to be detachably mounted, the message providing apparatus comprising:
   a sound output device which reproduces the sound read from said semiconductor memory device which is mounted to the apparatus; and
   a display device which displays the images, character or graphic read from said semiconductor memory device which is mounted to the apparatus, wherein said nonvolative semiconductor memory device further stores software identification data, the apparatus further comprising, an identification memory which stores a hardware identification data of said apparatus, a collator which detects whether the software identification read from the semiconductor memory device which is mounted to the apparatus corresponds to the hardware identification read from the identification memory; and wherein said sound output device reproduces the sound included in the message read from said semiconductor memory device when said collator detects that the software identification corresponds to the hardware identification, and said display device displays the still image, moving image, character and graphic included in the message read from said semiconductor memory device when said collator detects that the software identification corresponds to the hardware identification.

2. The apparatus according to claim 1, wherein said semiconductor memory device stores a still image, moving image, character, graphic or sound, respectively, as layer data, and said display device displays a plurality of layer data to be superimposed.

3. The apparatus according to claim 1, wherein said message data comprises advertisement data and further comprising a printer for printing advertisement data, advertisement related information, price reduction ticket, money certificate, lottery ticket, or coupon ticket.

4. A commodity display tool comprising:
a cabinet portion having a commodity housed therein; and
a message providing apparatus according to one of claims 1, 2 or 3 which is disposed integrally at said cabinet portion.

5. An advertisement display apparatus comprising:
an advertisement display device; and
a message providing apparatus according to one of claims 1, 2 or 3 which is disposed integrally in said advertisement display device.

6. The apparatus according to claim 1, wherein said message data comprises advertisement data and further comprising an order input device which receives an order from a customer.

7. The message providing apparatus according to claim 1, wherein said sound output device starts reproduction of the sound and said display device starts display of the images, character or graphic when said apparatus is powered on.

8. The message providing apparatus according to claim 1, wherein said sound output device restarts reproduction of the sound when all sound data has been reproduced and said display device restarts display of the images, character or graphic when all images, character or graphic data has been reproduced.

9. The apparatus according to claim 1, further comprising:
a subject detector which detects a presence of a subject by using one of an infrared ray and ultrasound wave which are transmitted to the subject and reflected therefrom and a thermal signal transmitted from the subject; and
a volume controller which increases an output volume of said sound output device when said subject detector detects the presence of the subject and decreases the volume when said subject detector does not detect the presence of the subject.

10. The message providing apparatus according to claim 1, wherein:

said storage device further stores attribute data of the message data indicating a time when the message data should be provided, said sound output device reproduces the sound read from said storage device at a time determined by the attribute data of the message data, and said display device displays the images, character or graphic read from said storage device at a time determined by the attribute data of the message data.

11. A message providing apparatus comprising:
a storage device which stores message data containing at least one of a still image, moving image, character, graphic and sound;

a sound output device which reproduces sound read from said storage device;

a display device which displays images, character or graphic read from said storage device;

a subject detector which detects a presence of a subject by using one of an infrared ray and ultrasound wave which are transmitted to the subject and reflected therefrom and a thermal signal transmitted from the subject; and a suspend controller which suspends a sound output operation of said sound output device and a display operation of said display device when said subject detector does not detect the presence of the subject and restarts the sound output operation of said sound output device and the display operation of said display device when said subject detector detects the presence of the subject, wherein said nonvolative semiconductor memory device further stores software identification data, and wherein the apparatus further comprising:
an identification memory when stores a hardware identification data of said apparatus;

a collator which detects whether the software identification read from the semiconductor memory device which is mounted to the apparatus corresponds to the hardware identification read from the identification memory; and wherein said sound output device reproduces the sound included in the message read from said semiconductor memory device when said collator detects that the software identification corresponds to the hardware identification; and said display device displays the still image, moving image, character and graphic included in the message read from said semiconductor memory device when said collator detects that the software identification corresponds to the hardware identification.

12. A message providing apparatus to which a nonvolatile semiconductor memory which stores software identification data thereof, and message data containing at least one of a still image, moving image, character, graphic and sound is able to be detachably mounted, the message providing apparatus comprising:

an identification memory which stores a hardware identification data of said apparatus;

a collator which detects whether the software identification read from the semiconductor memory device which is mounted to the apparatus corresponds to the hardware identification read from the identification memory;

a sound output device which reads the message data from said semiconductor memory device which is mounted to the apparatus and reproduces sound read included in said read message data when said collator detects that the software identification corresponds to the hardware identification; and a display device which reads the message data from said semiconductor memory device which is mounted to the apparatus and displays images, character or graphic included in said message data when said collator detects that the software identification corresponds to the hardware identification.

13. The apparatus according to claim 12, wherein said semiconductor memory device further stores attribute data indicating message data validity, and said sound output device and said display device do not reproduce and display message data whose validity has expired based on the attribute data read from said semiconductor memory device.

14. The apparatus according to claim 12, wherein mask data invalidating identification setting is added to said software identification data, and when said mask data invalidates identification setting, said collator detects coincidence between the software identification and the hardware identification.

* * * * *

UNITED STATES PATENT AND TRADEMARK OFFICE
CERTIFICATE OF CORRECTION

PATENT NO.     : 6,717,522 B1
DATED          : April 6, 2004
INVENTOR(S)    : Hideo Nagatomo et al.

It is certified that error appears in the above-identified patent and that said Letters Patent is hereby corrected as shown below:

Column 38,
Lines 1 and 5, change "storage device" to -- nonvolatile semiconductor memory device --;
Line 31, change "nonvolative semiconductor memory device" to -- storage device --;
Line 52, delete claim 12 and replace with
    -- A message providing apparatus comprising:
       a storage device which stores message data containing at least one of a still image, moving image, character, graphic and sound;
       a sound output device which reproduces sound read from said storage device;
       a display device which displays images, character or graphic read from said storage device;
       an identification memory which stores an identification data for identifying said apparatus;
       a receiver which receives new message data for rewriting said message data, the new message data being with an identification data; and
       a rewrite circuit which rewrites said message data stored in said storage device based on the new message when the identification data of the new message coincides with the identification data stored in said identification memory. --

Column 39,
Line 10, delete claim 13 and replace with
    -- The message providing apparatus according to claim 1, wherein:
       said nonvolatile semiconductor memory device further stores attribute data of the message data indicating a time when the message data should be provided,
       said sound output device reproduces the sound read from said nonvolatile semiconductor memory device at a time determined by the attribute data of the message data, and
       said display device displays the images, character or graphic read from said nonvolatile semiconductor memory device at a time determined by the attribute data of the message data. --

UNITED STATES PATENT AND TRADEMARK OFFICE
CERTIFICATE OF CORRECTION

PATENT NO. : 6,717,522 B1
DATED : April 6, 2004
INVENTOR(S) : Hideo Nagatomo et al.

It is certified that error appears in the above-identified patent and that said Letters Patent is hereby corrected as shown below:

Column 40,
Line 5, change "claim 12," to -- claim 1, --;
Line 7, change "when" to -- if --.

Signed and Sealed this

Twenty-sixth Day of October, 2004

JON W. DUDAS
*Director of the United States Patent and Trademark Office*